(12) United States Patent
Verkade

(10) Patent No.: US 10,427,790 B2
(45) Date of Patent: Oct. 1, 2019

(54) ADAPTIVE AERIAL VEHICLE

(71) Applicant: David A. Verkade, Kentwood, MI (US)

(72) Inventor: David A. Verkade, Kentwood, MI (US)

(73) Assignee: David A. Verkade, Kentwood, MI (US)

( * ) Notice: Subject to any disclaimer, the term of this patent is extended or adjusted under 35 U.S.C. 154(b) by 43 days.

(21) Appl. No.: 15/620,112

(22) Filed: Jun. 12, 2017

(65) Prior Publication Data
US 2018/0354625 A1 Dec. 13, 2018

(51) Int. Cl.
*B64D 9/00* (2006.01)
*B64C 39/02* (2006.01)

(52) U.S. Cl.
CPC .............. *B64D 9/00* (2013.01); *B64C 39/024* (2013.01); *B64C 2201/024* (2013.01); *B64C 2201/027* (2013.01); *B64C 2201/042* (2013.01); *B64C 2201/108* (2013.01); *B64C 2201/126* (2013.01); *B64C 2201/128* (2013.01)

(58) Field of Classification Search
CPC ................................ B64D 9/00; B64C 39/024
See application file for complete search history.

(56) References Cited

U.S. PATENT DOCUMENTS

| 9,561,852 | B1* | 2/2017 | Beaman | B64D 1/00 |
|---|---|---|---|---|
| 2010/0301159 | A1* | 12/2010 | Schnitzer | B64D 1/04 |
| | | | | 244/54 |
| 2015/0136897 | A1* | 5/2015 | Seibel | B64C 29/0033 |
| | | | | 244/6 |
| 2016/0023755 | A1* | 1/2016 | Elshafei | G08G 5/025 |
| | | | | 244/17.13 |
| 2017/0323257 | A1* | 11/2017 | Cheatham, III | G06Q 10/0832 |
| 2017/0355461 | A1* | 12/2017 | Naito | B64C 13/18 |
| 2018/0039283 | A1* | 2/2018 | Srivastava | B60W 40/13 |
| 2018/0107211 | A1* | 4/2018 | Schubert | G05D 1/0044 |
| 2018/0111683 | A1* | 4/2018 | Di Benedetto | B64C 39/024 |
| 2018/0231972 | A1* | 8/2018 | Woon | G05D 1/104 |

* cited by examiner

*Primary Examiner* — Alex C Dunn
(74) *Attorney, Agent, or Firm* — Warner Norcross + Judd LLP

(57) ABSTRACT

An adaptive aerial vehicle includes a vehicle support, at least one frame assembly mounted relative to the support, at least one propulsion unit mounted to the frame assembly and operable to move the adaptive aerial vehicle, and an actuator configured to move the support relative to the frame assembly to redistribute the weight of the adaptive aerial vehicle.

20 Claims, 18 Drawing Sheets

ADAPTIVE AERIAL VEHICLE

BACKGROUND

Unmanned aerial vehicles (UAVs) are increasingly being considered for performing complex functions and assisting humans in carrying out dangerous missions within dynamic environments. Applications include search and rescue, disaster relief operations, environmental monitoring and package delivery. Design parameters for these types of autonomous vehicles place demands on control schemes that can adapt to different mission scenarios and potential changes to vehicle dynamics. Current multirotor UAVs typically are designed using a coplanar rotor configuration and have become an increasingly popular platform for unmanned aerial vehicles. Many research and development efforts have been dedicated to the coplanar rotor configuration. These multirotors generally assume the center of gravity (CoG) to be static and known.

SUMMARY

A need exists for improvements in structure and design of unmanned aerial vehicles (UAVs) to consider dynamic changes in the CoG. The present invention provides an adaptive aerial vehicle with a nonplanar rotor configuration and control systems and methods that compensate for dynamic changes in the center of gravity. Compensating for changes in the center of gravity of a unmanned aerial vehicle (UAV) prevents the potential for dangerous oscillations that may occur, which can negatively affect stability of a UAV.

Advantageously, the adaptive aerial vehicle can perform agile maneuvers while reconfiguring to compensate for a change in the center of gravity in real-time whenever the need occurs.

In one aspect of the present disclosure an adaptive aerial vehicle is described. The adaptive aerial vehicle includes: a support; first and second frame assemblies respectively disposed on the support, an actuation assembly interconnected to the support and configured to extend and retract the support to a plurality of distances relative to first and second frame assemblies, a plurality of propulsion units mounted on first and second frame assemblies and operable to move the adaptive aerial vehicle.

In another aspect of the present disclosure an adaptive aerial vehicle is described. The adaptive aerial vehicle includes: a support; first and second frame assemblies that straddle the airframe center of gravity and are respectively disposed on the support, an actuation assembly interconnected to the support and configured to extend and retract the support to a plurality of distances relative to adaptive aerial vehicle center of gravity, a plurality of propulsion units mounted on first and second frame assemblies and operable to move the adaptive aerial vehicle.

In another aspect of the present disclosure an adaptive aerial vehicle is described. The adaptive aerial vehicle includes: a support; first and second frame assemblies that straddle the airframe center of gravity and are respectively disposed on the support, an actuation assembly interconnected to the support and configured to extend and retract the support to a plurality of distances relative to adaptive aerial vehicle center of gravity and simultaneously increase or decrease distance of first frame assembly relative to second frame assembly, a plurality of propulsion units mounted on first and second frame assemblies and operable to move the adaptive aerial vehicle.

In another aspect of the present disclosure an adaptive aerial vehicle is described. The adaptive aerial vehicle includes: a support supported by a base resting on a surface (e.g. the ground) coupled to a payload whereupon the distance necessary to extend the support to redistribute the adaptive aerial vehicle weight to compensate for the change in center of gravity due to static payload weight is automatically calculated using feedback provided by a load sensor and received by a controller configured to trigger an actuation assembly interconnecting the support to first and second frame assemblies to extend the support thereby increasing the distance of first frame assembly relative to second frame assembly and thereby redistributing adaptive aerial vehicle airframe weight to compensate for this change in center of gravity due to payload weight.

In another aspect of the present disclosure an adaptive aerial vehicle is described. The adaptive aerial vehicle includes: a support coupled to a payload whereupon the distance necessary to extend the support to redistribute the adaptive aerial vehicle weight to compensate for the change in center of gravity due to dynamic changes in payload weight is automatically calculated using feedback provided by a load sensor and received by a controller configured to trigger an actuation assembly interconnecting the support to first and second frame assemblies to extend the support thereby increasing the distance of first frame assembly relative to second frame assembly and thereby redistributing adaptive aerial vehicle airframe weight to compensate for this change in center of gravity due to payload weight.

In another aspect of the present disclosure an adaptive aerial vehicle is described. The adaptive aerial vehicle includes: a support supported by a base coupled to a payload carrier which in part is coupled to a strain gauge/load sensor, upper and lower payload carrier plates around which an elastomeric restraint (e.g., bungee cord) is provided whereupon extension of the support due to operating a payload on lower payload carrier plate stretches the bungee providing tension forcing the lower payload carrier plate to move payload against upper payload carrier plate securing it in place.

In some embodiments, the actuation assembly includes a linear actuator, and a portion of each of the first and second frame assemblies is coupled to the linear actuator. The linear actuator is coupled to a portion of first and second frame assemblies (e.g., clevis). The linear actuator extends and retracts simultaneously increasing and decreasing the distance between first and second frame assemblies.

In some embodiments, each of the plurality of propulsion units includes a rotor. The rotor can be oriented horizontally relative to the adaptive aerial vehicle.

In some embodiments, the adaptive aerial vehicle further includes a receiver, the receiver configured to receive user commands for controlling one or more of the actuation assembly and the plurality of propulsion units. The user commands can be transmitted from a remote terminal.

In some embodiments, the adaptive aerial vehicle further includes a payload coupled to the central body. The payload can include an image capturing device.

It shall be understood that different aspects of the invention can be appreciated individually, collectively, or in combination with each other. Various aspects of the invention described herein may be applied to any of the particular applications set forth below or for any other types of movable objects. Although the systems, devices, and methods described herein are generally presented in the context of aerial vehicles, this is not intended to be limiting, as the following embodiments can be applied to any suitable movable object. Any description herein of an aerial vehicle may apply to and be used for any movable object, such as any vehicle. Additionally, the systems, devices, and methods disclosed and described herein in the context of aerial motion (e.g., flight) may also be applied in the context of other types of motion, such as movement on the ground or on water, underwater motion, or motion in space. Other objects and features of the present invention will become apparent by a review of the specification, claims, and appended photos and figures.

DETAILED DESCRIPTION

Figure 1:
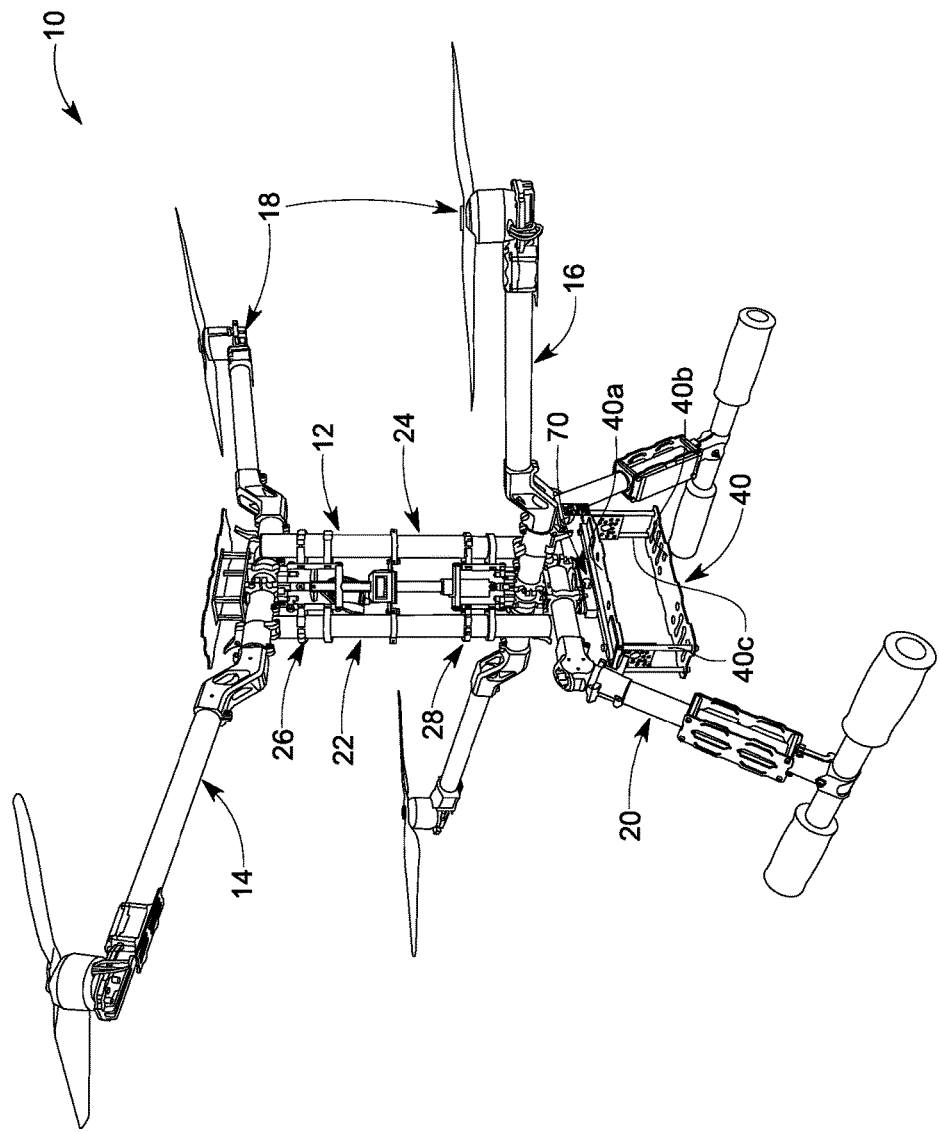
FIG. 1 is a perspective view of an adaptive aerial vehicle.

Referring now to FIG. 1, the numeral 10 designates an adaptive aerial vehicle. As will be more fully described adaptive aerial vehicle 10 is configured so that the mounting arrangement of its propulsion units straddle the center of gravity of the vehicle and, optionally, so that its configuration can be adjusted to maintain the center of gravity (CoG) in a generally fixed position even when a load is added to the adaptive aerial vehicle 10. Alternately or in addition, adaptive aerial vehicle 10 is configured so that its configuration can be adjusted to accommodate different flying conditions to thereby adjust the trim. This adjustment can be done by a person controlling the adaptive aerial vehicle 10 or can been done by the adaptive aerial vehicle 10 itself.

Referring again to FIG. 1, adaptive aerial vehicle 10 includes a vehicle support 12 and one or more frame assemblies, which are mounted to support 12 and in turn support one or more propulsion units. In the illustrated embodiment, support 12 is configured so that it can extend or contract to adjust the weight distribution on adaptive aerial vehicle 10. Further, support 12 is configured to extend or contract to adjust the distance between the frame assemblies to adjust the center of gravity of the adaptive aerial vehicle 10 and/or adjust the trim.

As best seen in FIG. 1, adaptive aerial vehicle 10 may include two frame assemblies, namely first and second (such as upper and lower) frame assemblies 14, 16, with each mounted to support 12 and each supporting two propulsion units 18 at or on their opposed ends. In addition, lower frame assembly 16 mounts support 12 and upper frame assembly 14 to a base 20, as will be more fully described below. Additionally, as noted, upper and lower frame assemblies 14, 16 are mounted to support 12 so they straddle the center of gravity (CoG) of vehicle 10.

Base 20 may be a linear, curved, or curvilinear structure. In general, base 20 can be used to support the vehicle 10 on a surface (e.g., before takeoff or after landing). For example, base 20 can contact the surface at one, two, three, four, or more points of contact. Optionally, base 20 is configured to support vehicle 10 on a surface upon landing or before takeoff such that the other portions of vehicle 10 (e.g. support 12 or frame assemblies 14, 16) do not touch the surface.

Optionally, base 20 may be movable relative to support 12, such as by sliding, rotating, telescoping, folding, pivoting, extending, shrinking, and so on.

Figure 4:
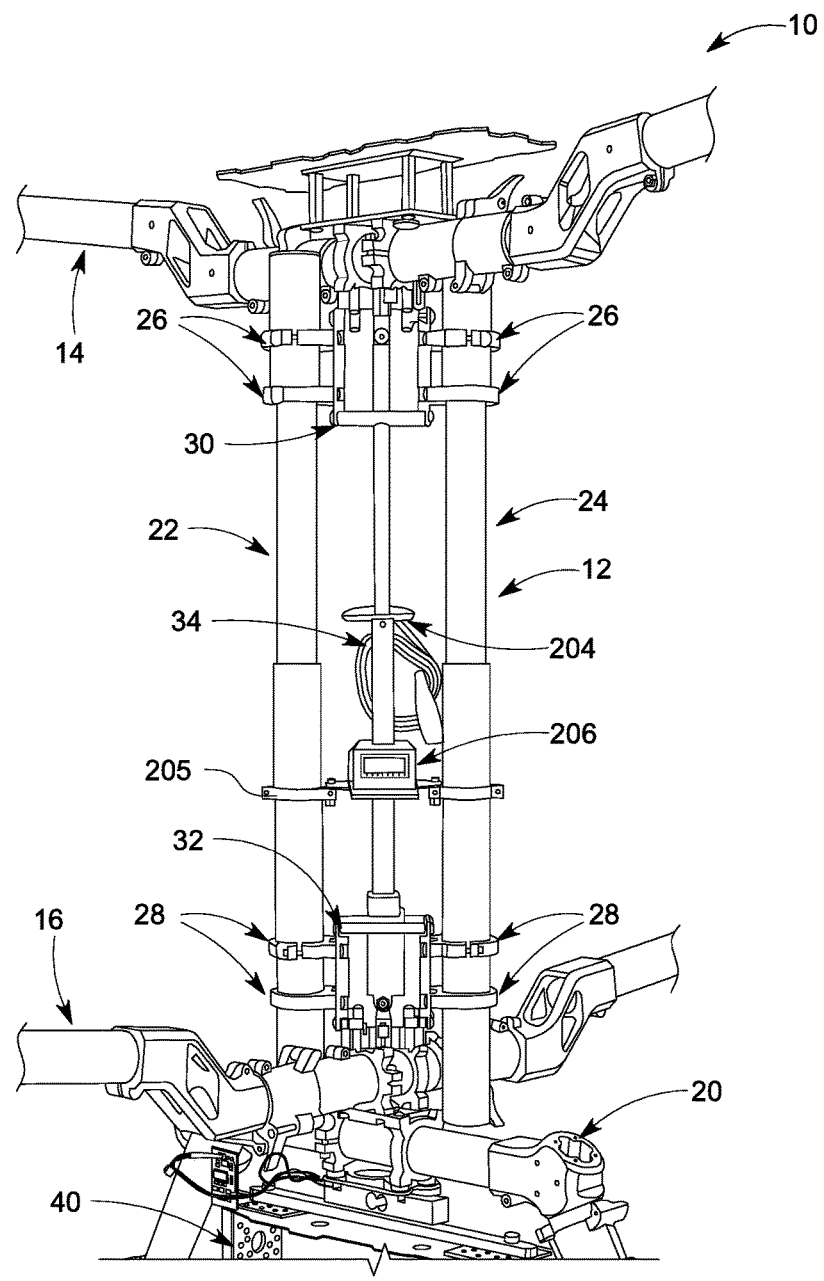
FIG. 4 is an enlarged fragmentary view of the support frame of the aerial vehicle illustrating the mounting of the first and second frame assemblies that support propulsion units.

In one embodiment, support 12 is formed by two telescoping members 22, 24. For example, telescoping members 22, 24 may comprise telescoping nested cylindrical members. Referring to FIG. 4, telescoping members 22, 24 are supported in a spaced relationship to each other by upper and lower brackets 26, 28 (which connect to telescoping members 22, 24) and upper and lower frames 30, 32 to which brackets 26, 28 mount. Frames 30, 32 and brackets 26, 28 also support an actuator 34 for extending or contracting telescoping members 22, 24. Further, as will be more fully described below, frames 30, 32 provide mounts for frame assemblies 14, 16.

In one embodiment, actuator 34 comprises a linear actuator, such as a lead screw driven actuator, which is controlled by a controller 36 (FIG. 9), described more fully below. As noted above, in one embodiment, support 12 is configured so that it can extend or contract and thereby adjust the spacing between the frame assemblies 14, 16 to adjust the center of gravity of the adaptive aerial vehicle 10, for example, when a load is supported by adaptive aerial vehicle 10.

Figure 2:
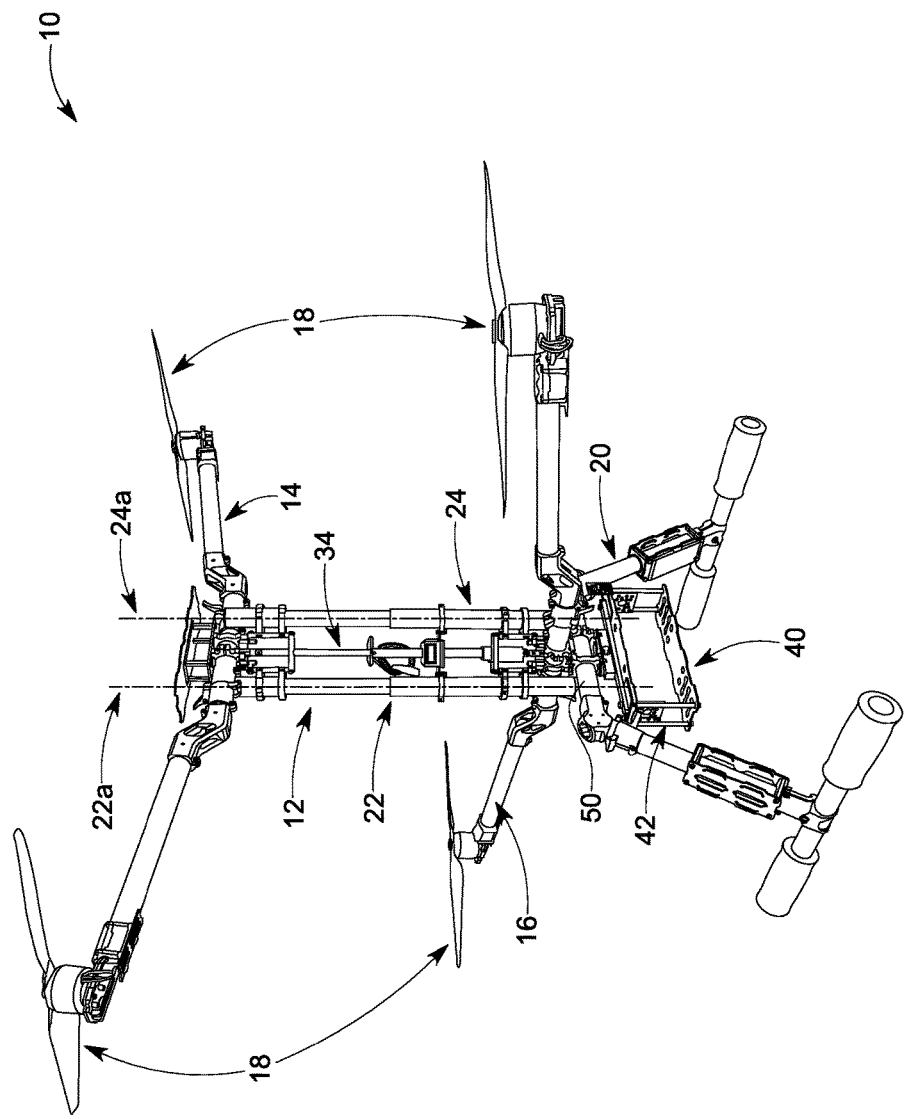
FIG. 2 is a similar view to FIG. 1 illustrating the aerial vehicle of FIG. 1 in an expanded configuration.
Figure 2A:
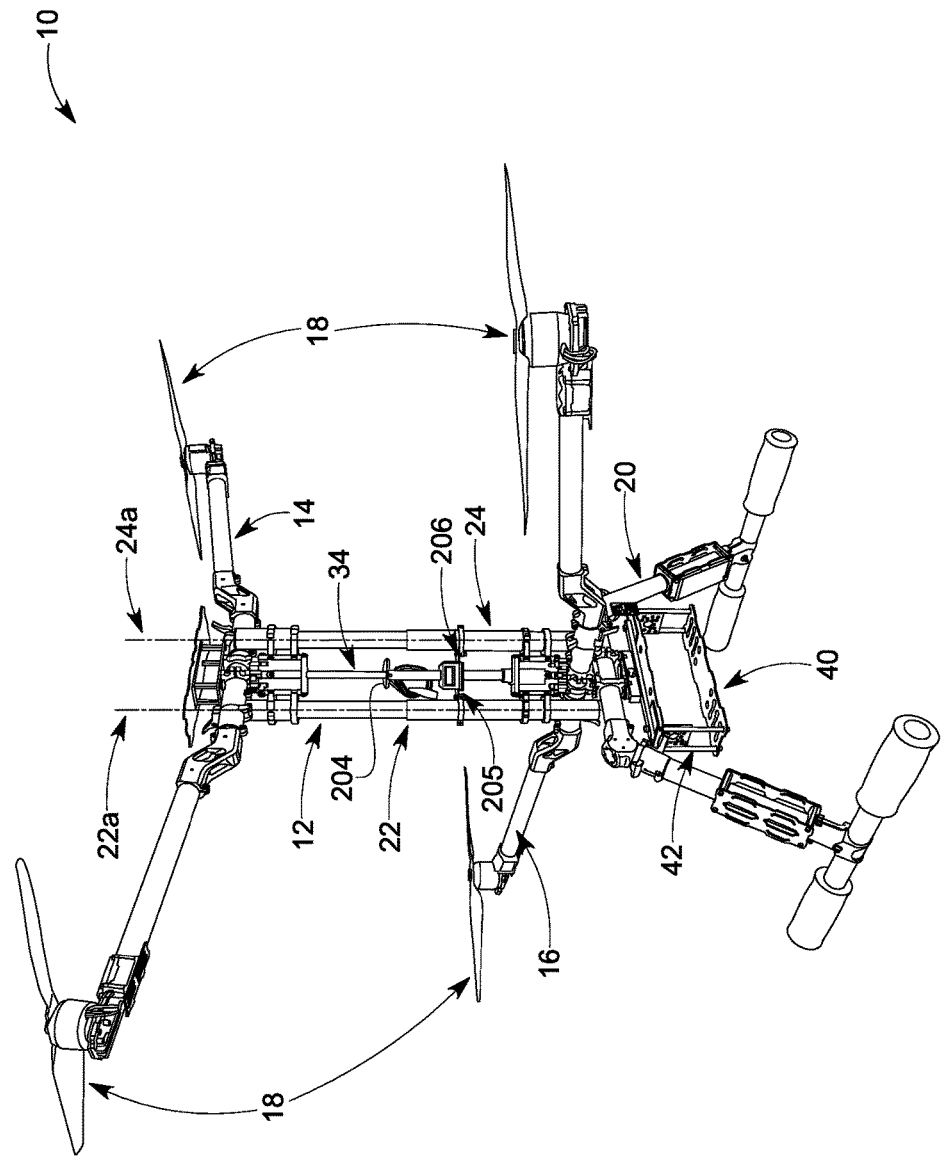
FIG. 2A is a line drawing of FIG. 2.
Figure 3:
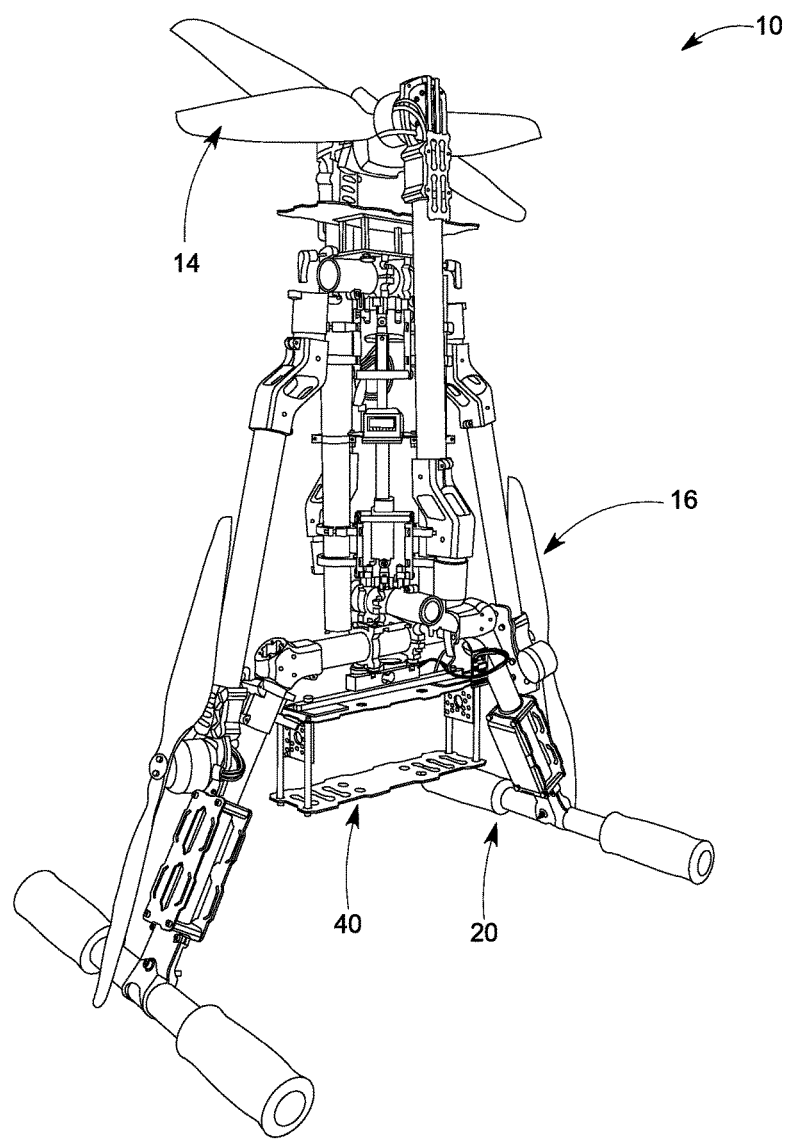
FIG. 3 is a similar view to FIG. 1 illustrating the aerial vehicle of FIG. 1 in a folded configuration.

As best seen in FIG. 2, adaptive aerial vehicle 10 may include a mount 40 for supporting a payload. For example, mount 40 may comprise a frame 42, and optionally an adjustable frame, to hold and support a payload. The configuration and location of the mount may vary. In the illustrated embodiment, frame 42 is mounted to base 20.

Figure 1A:
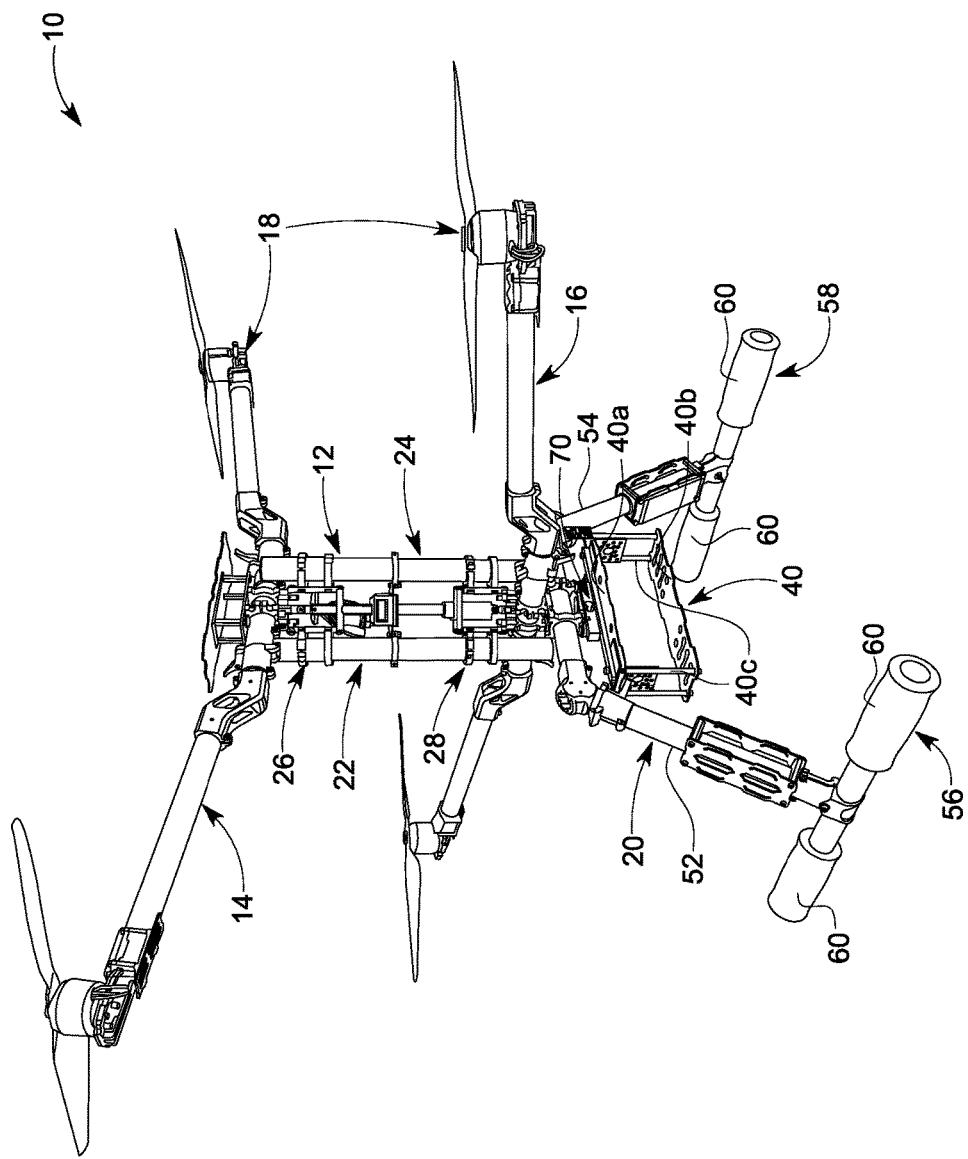
FIG. 1A is a line drawing of FIG. 1.
Figure 5:
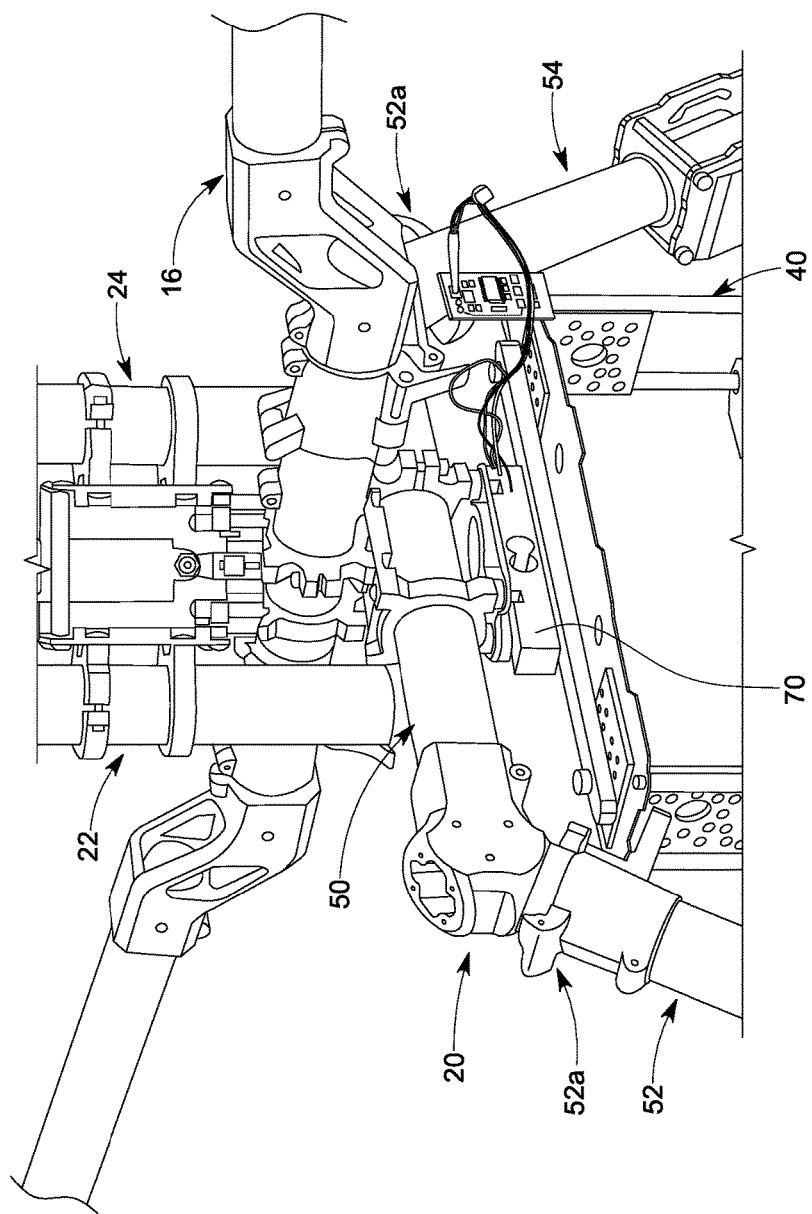
FIG. 5 is an enlarged fragmentary view of the support frame of the aerial vehicle illustrating the mounting of the second frame assembly.
Figure 6:
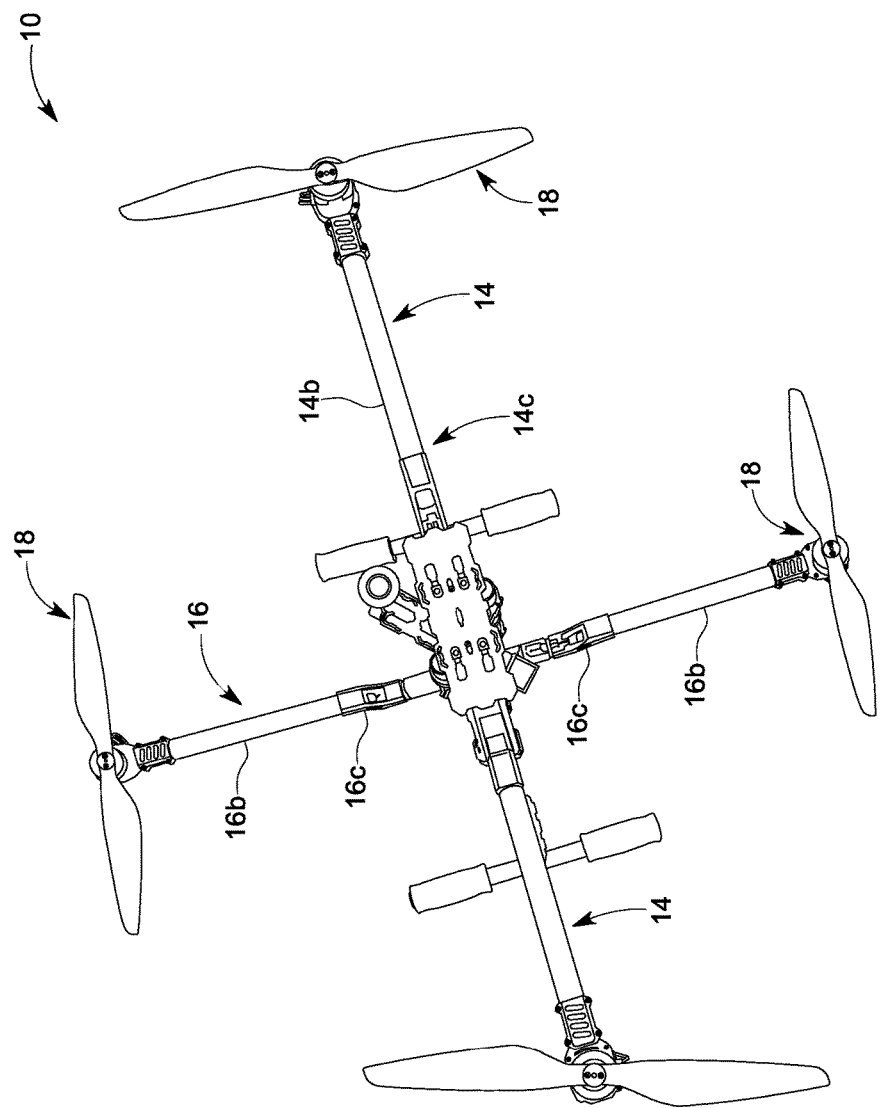
FIG. 6 is a top plan view of adaptive aerial vehicle of FIG. 1.
Figure 6A:
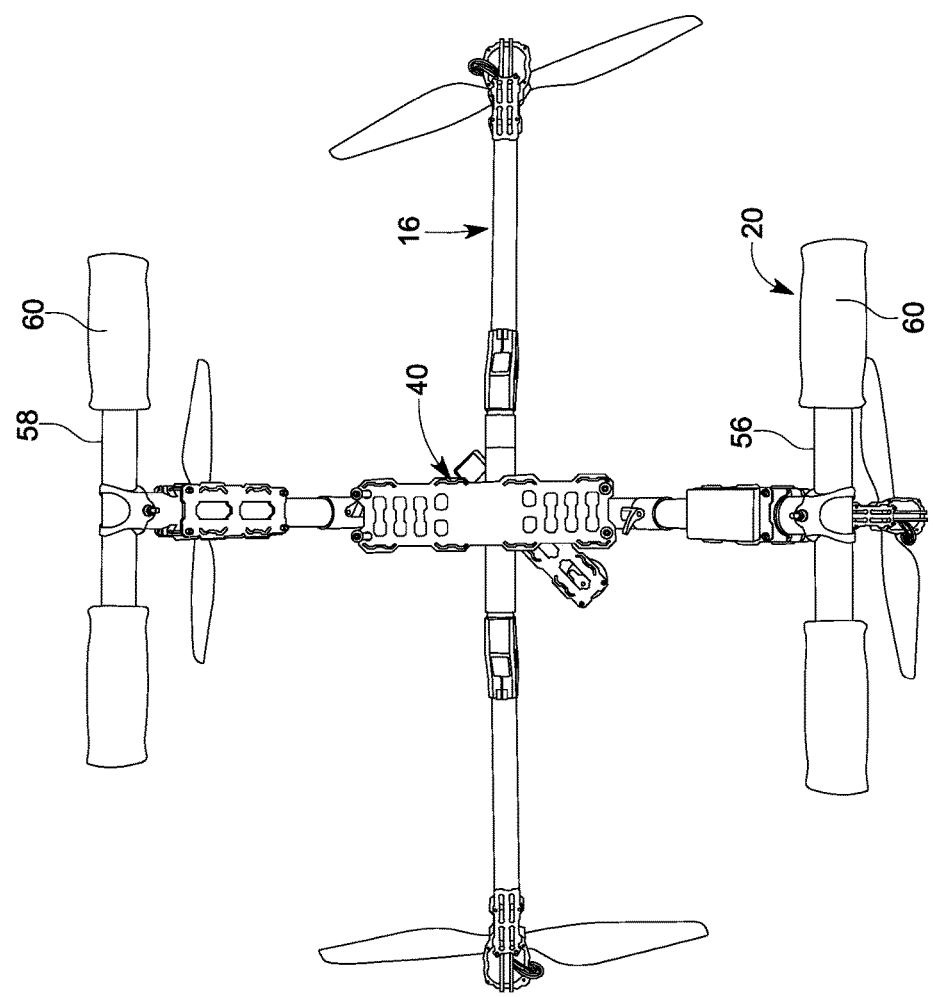
FIG. 6A is a bottom plan view of adaptive aerial vehicle of FIG. 1.

As best seen in FIG. 5, base 20 may include a transverse member 50, such as a tube, and a pair of opposed legs 52, 54 that are mounted to transverse member 50. Optionally, legs 52, 54 may be pivotally mounted to transverse member 50 by hinged brackets 52a, so that legs 52, 54 may be folded. Legs 52, 54 may also comprise tubes and include outwardly extending feet 56, 58 (FIG. 1A) mounted to their respective distal ends to provide stability to base 20 and to adaptive aerial vehicle 10. For example, feet 56, 58 may each be formed by a transverse tube mounted by brackets to the distal end of legs. Further, feet 56, 58 may include resilient pads or covers 60 (FIG. 1A), such as cushioned sleeves, that may reduce impact when the adaptive aerial vehicle 10 lands on a hard surface.

Figure 7:
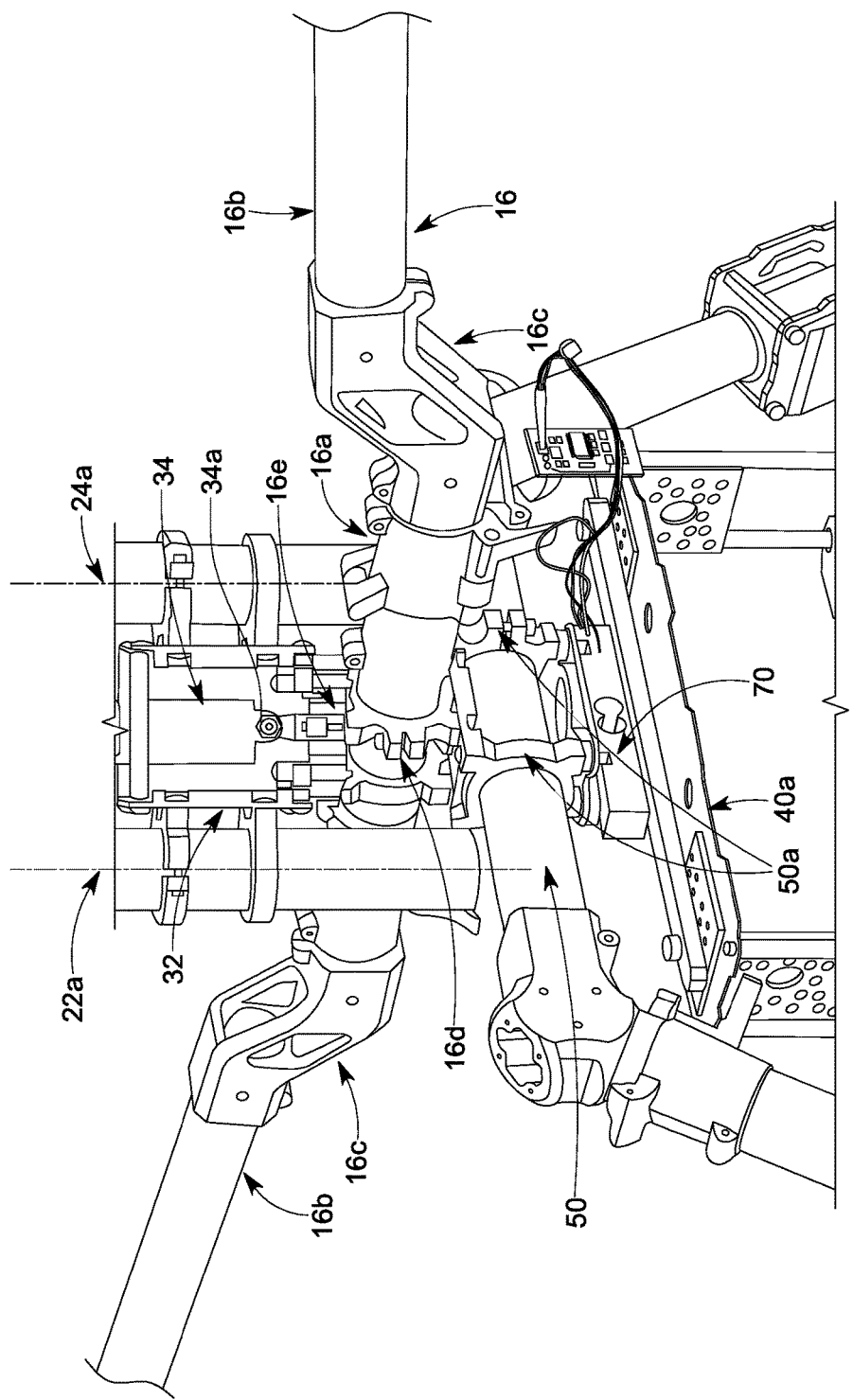
FIG. 7 is an enlarged perspective view of the mounting details of the lower frame assembly, the support, and the base of the aerial vehicle of FIG. 1.
Figure 8:
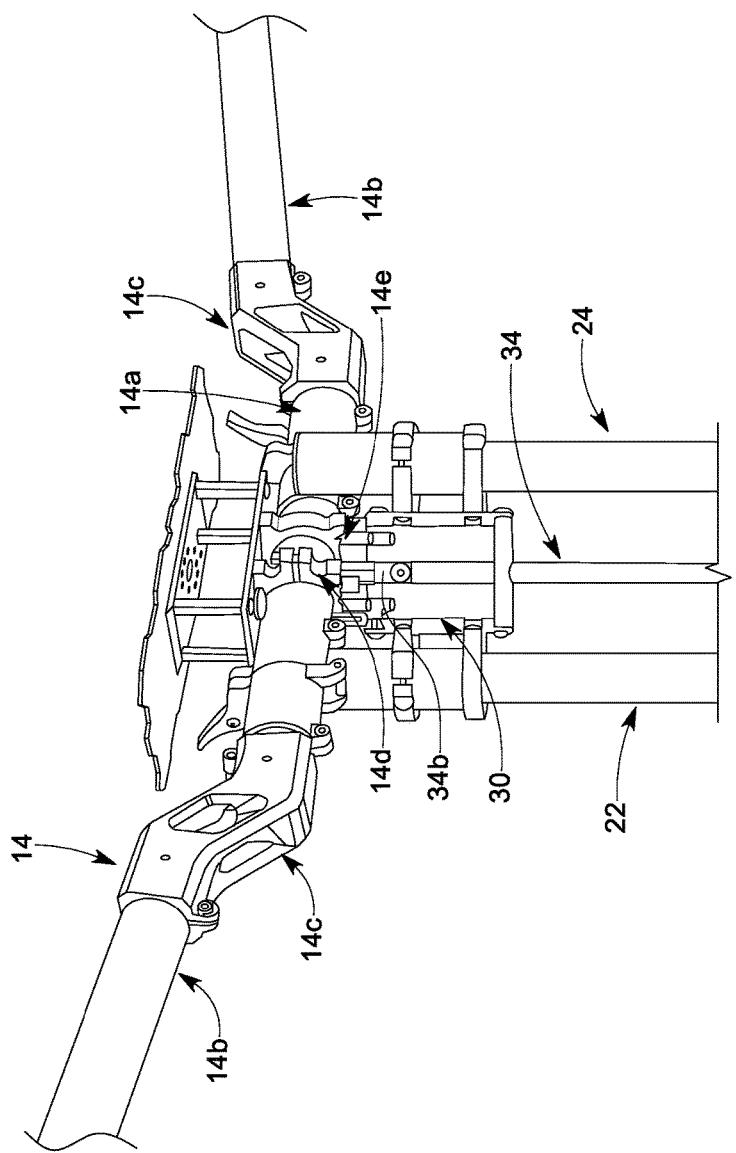
FIG. 8 is an enlarged perspective view of the mounting details of the upper frame assembly and the actuator and battery mounts of the adaptive aerial vehicle of FIG. 1.

As best seen in FIGS. 7 and 8, each frame assembly 14, 16 includes a transverse member 14a, 16a, and a pair of or arms 14b, 16b, which are optionally mounted to their respective transverse members 14a, 16a by hinged brackets 14c, 16c so that the arms 14b, 16b may be folded. For example, transverse members 14a, 16a and arms 14b, 16b may be formed from tubes or tubular members. Further, transverse members 14a, 16a are coupled to support 12 via brackets 14e, 16e, which mount to U-shaped frames 30, 32, respectively. The arms 14b, 16b of each frame assembly 14, 16 may be arranged at any suitable angle relative to support 12, including a perpendicular angle or an approximately perpendicular angle to support 12.

Additionally, brackets 14e, 16e mount transverse members 14a, 16a between telescoping members 22, 24 and in an orientation that is perpendicular to the plane that extends through the longitudinal axes 22a, 24a (FIGS. 2, 7) of telescoping members 22, 24. In this manner, when actuator 34 is extended or contracted, telescoping members 22, 24 will extend or contract and frame assemblies 14, 16 will move relative to each other to adjust the weight distribution of the aerial vehicle. As will be more fully detailed below, by adjusting the weight distribution to account for weight added to the vehicle, for example, when adding a payload, vehicle 10 can maintain its center of gravity at a generally fixed location relative to an inertial measurement unit (IMU), which forms part of the flight controller (described below).

As noted above, actuator 34 comprises a linear actuator. In the illustrated embodiment, actuator 34 has its stationary end 34a mounted to bracket 16e (FIG. 7) and its extendible end 34b mounted to bracket 14e (FIG. 8). In this way actuator 34 is coupled to both frame assemblies 14, 16 and telescoping members 22, 24.

In addition to adding weight to adaptive aerial vehicle 10, the payload may provide a function. For example, the payload may be configured to perform a function, such as a sensor, emitter, tool, instrument, manipulator or any other functional device. In some instances, the payload may comprise an image capturing device, such as camera, which may be pointed downwards relative to support 12. The camera may be mounted by an articulating mount so that it is configured to move, e.g. rotate, relative to support 12.

The payload may also be associated with a functional space. The functional space may be a space occupied, affected, manipulated, or otherwise used by the payload during its operation, as previously described herein. For example, the functional space of a sensor can be the space from which the sensor can collect data. In some instances, the functional space of a camera or other image capture device can be an unobstructed field of view or viewing angles of the camera. For a tool, instrument or manipulator mechanism, the functional space can be an unobstructed working range or movement range. For example, a functional space of an emitter (e.g., illumination source) may be an unobstructed area which may receive emissions (e.g., illumination) from the emitter.

In the illustrated embodiment, payload support 40 is configured to hold a payload in position using compression forces. For example, referring to FIG. 1, payload support 40 includes a base plate 40a, which is coupled to transverse member 50, optionally, via a strain gauge plate 70 (FIGS. 1 and 7). Strain gauge plate 70 is mounted to transverse member 50 via brackets 50a (FIG. 7). Movably mounted to base plate 40a is a movable plate 40b, which provides a movable support surface for the payload, so that the payload support may be adjusted to accommodate different size payloads and also, as described below, optionally to apply a compressive force on the payload to hold the payload in place. By locating a strain gauge between baseplate 40a and base 20, the weight of the payload may be determined.

Figure 9:
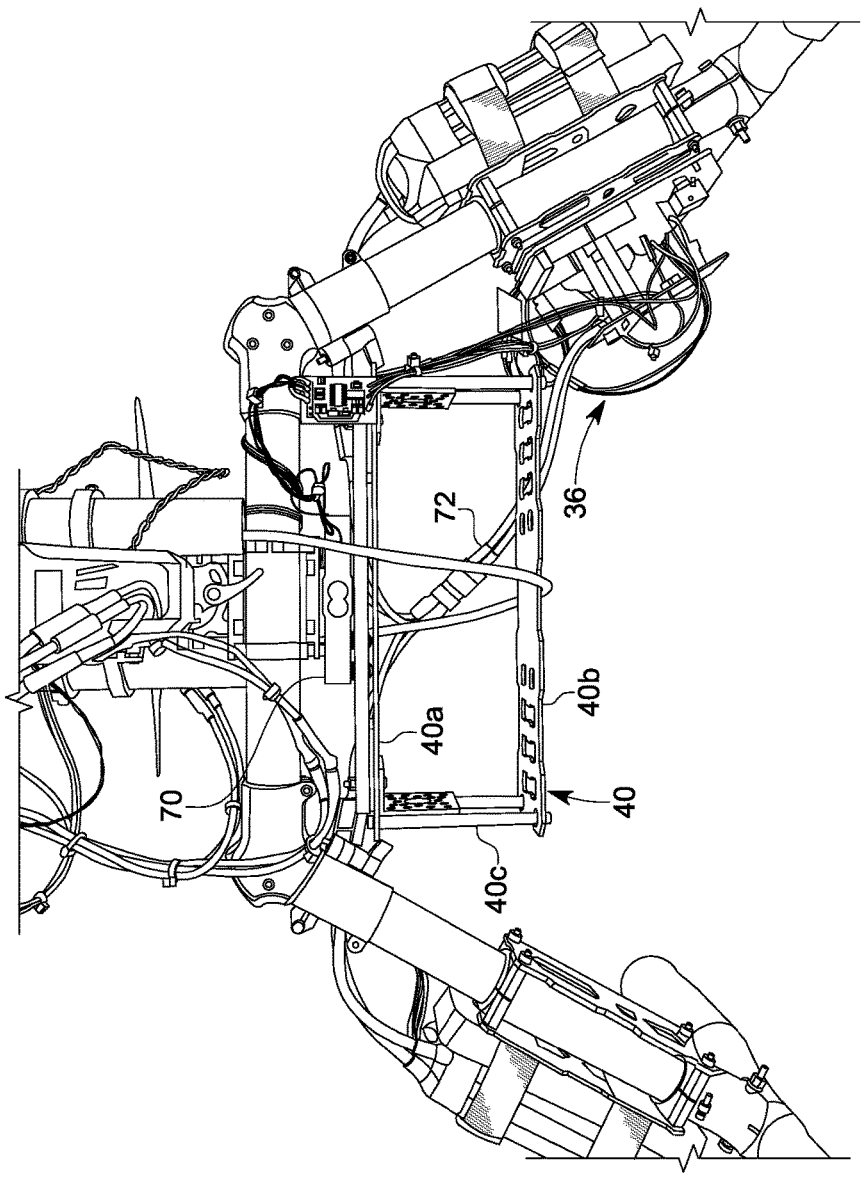
FIG. 9 is a side view of a payload support of the adaptive aerial vehicle.
Figure 10:
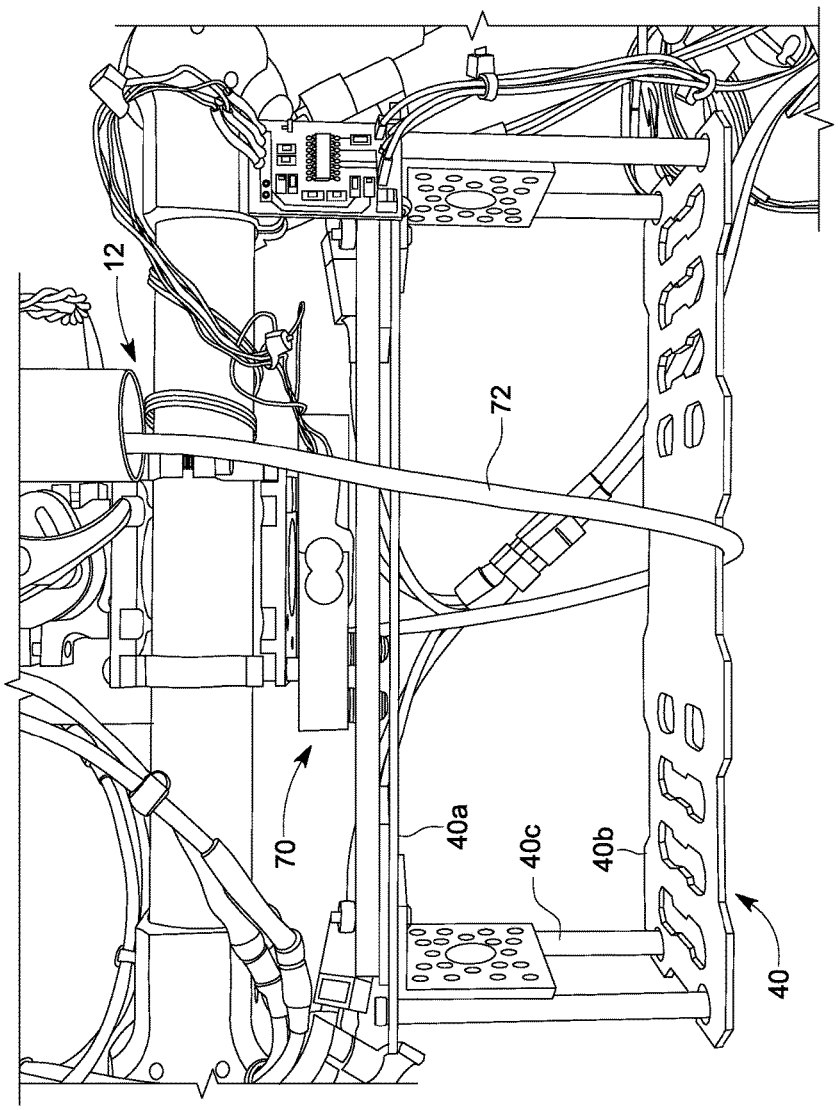
FIG. 10 is an enlarged view of the payload support in an open configuration.
Figure 11:
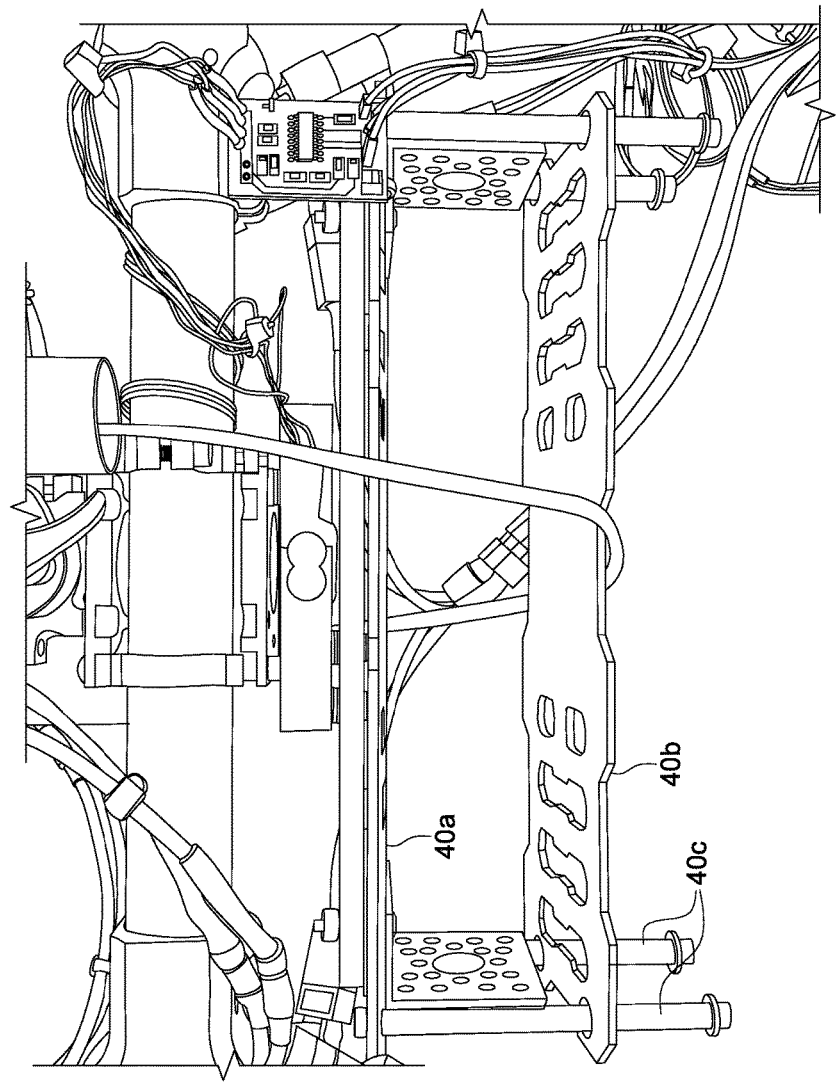
FIG. 11 is an enlarged view of the payload support in a closed configuration.

Plate 40b is optionally movably mounted to baseplate 40a via four guide posts 40c, which are secured to baseplate 40a and allow plate 40b to slide along posts 40c and move toward or away from baseplate 40a. Optionally as shown in FIGS. 9-11, plate 40b may be coupled to baseplate 40a via a restraint 72, such as an elastic restraint, including an elastic cord, which is extended around the underside of plate 40b and coupled at its ends to upper member of telescoping members 22, 24. In this manner, as telescoping members 22, 24 extend or contract, restraint 72 will be loosened or tensioned so that any payload supported on plate 40b will be compressed against baseplate 40a, and hence against base 20. Alternately, restraint 72 may be simply extended around the underside of plate 40b and secured at its opposite end to baseplate 40a so as not to affect the weight readings of strain gauge plate 70.

As noted above, adaptive aerial vehicle 10 includes one or more propulsion units. In the illustrated embodiment, adaptive aerial vehicle 10 includes four propulsion units 18, with one at each end of arms 14b, 16b of frame assemblies 14, 16. Propulsion units 18 can be used to enable adaptive aerial vehicle 10 to take off, land, hover, and move through the air with respective to up to three degrees of freedom of translation and up to three degrees of freedom of rotation. In some embodiments, the propulsion units 18 can include one or more rotors. The rotors can include one or more rotor blades coupled to a shaft. The rotor blades and shaft can be driven to rotate by a suitable drive mechanism, such as a motor. Although the propulsion units 18 of the adaptive aerial vehicle 10 are depicted as four rotors, as noted, any suitable number, type, and/or arrangement of propulsion units can be used. For example, the number of rotors may be one, two, three, four, five, six, seven, eight, or more. The rotors may be oriented vertically, horizontally, or at any other suitable angle with respect to adaptive aerial vehicle 10. The angle of the rotors may be fixed or variable. The propulsion units 18 can be driven by any suitable motor, such as a DC motor (e.g., brushed or brushless) or an AC motor. In some embodiments, the motor can be adapted to mount and drive a rotor blade.

As described above, frame assemblies 14, 16 may be used to couple the propulsion units 18 to support 12. The propulsion units can be mounted along the length of respective frame assemblies. Adaptive aerial vehicle 10 can include any suitable number of frame assemblies, such as one, two, three, four, or more. In some embodiments, adaptive aerial vehicle 10 includes at least one upper frame assembly 14 and one lower frame assembly 16. Each frame assembly 14, 16 can be used to support a single propulsion unit, or multiple propulsion units. The propulsion units can be evenly distributed among the frame assemblies. Alternatively, each frame assembly 14, 16 can have a different number of propulsion units.

As described above, support 12 can be extended and retracted, for example, through a plurality of positions and when extended, the distance that separates frame assembly 14 relative to frame assembly 16 increases. As would be understood, when retracted, the distance of frame assembly 14 relative to frame assembly 16 decreases.

The reconfiguration of support 12 can be controlled by a suitable control system 200 (FIG. 1B) mounted on vehicle 10. As noted above, this reconfiguration may be in response to changes in center of gravity of the vehicle 10 (e.g. due to the addition of a payload or payloads). For example, control system 200 mounted to support 12 or to base 20. In some embodiments, control system 200 can be configured to automatically control the distance support 12 extends and retracts, based on payload sensor feedback (from strain gauge 70) resulting from supporting static payload or from supporting a dynamic payload (e.g. a depleting payload, such as agricultural fertilizer applications, pesticide applications or delivery of a payload (e.g., delivering a package, such as medical supplies for disaster relief). Dynamic changes may also result from configuration (e.g. changing size and weight of battery configuration) of a vehicle 10.

Figure 1B:
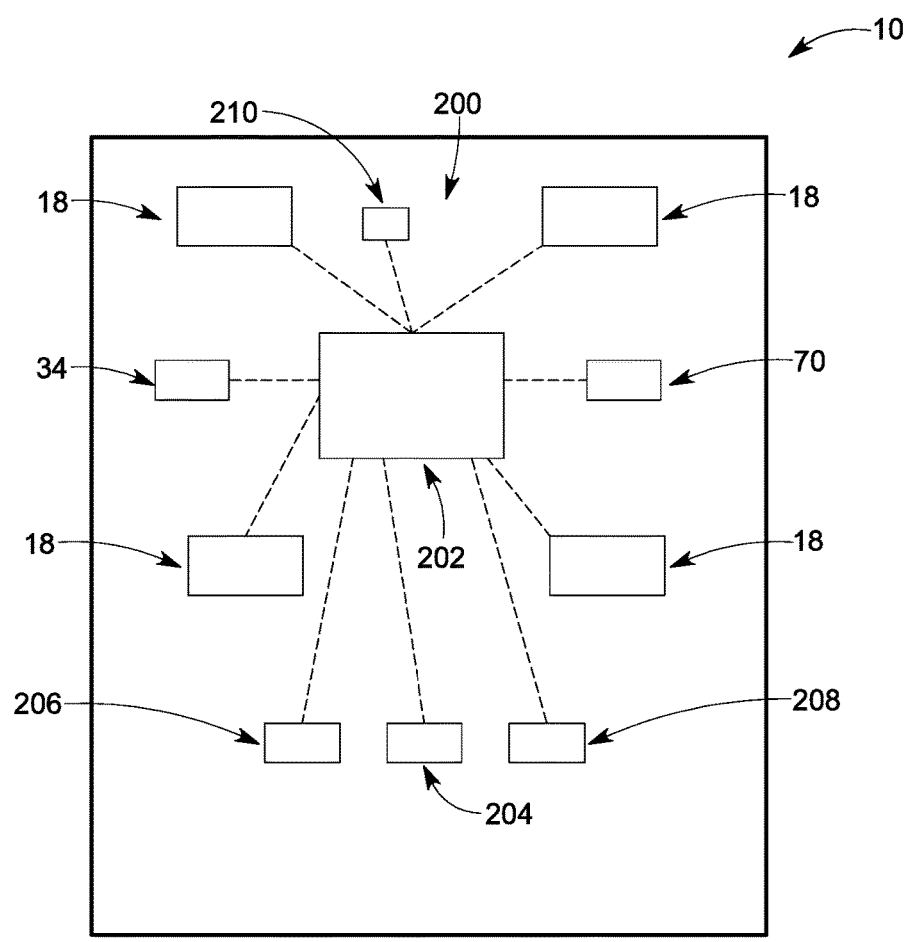
FIG. 1B is a schematic drawing of a control system for the adaptive aerial vehicle.

Optionally, referring to FIG. 1B, control system 200 may include a central processing unit 202, which is in communication with actuator 34, an antenna 204, such as a GPS antenna, a flight inertial measurement unit 206, and a load sensor array 208, all mounted on vehicle 10. Optionally as described below, the load sensor array may be mounted off the vehicle, for example, in a base. The inertial measurement unit (IMU) 206 and antenna 204 are mounted by a plate bracket 205 to support 12 so that they are located close to the CoG and are in communication with propulsion units 18 and comprise the flight controller/auto pilot of vehicle 10. A suitable IMU typically consists of an accelerometer, gyroscope and a barometer for sensing the attitude and altitude and is used by central processing unit 202 to control the propulsion units 18 when flying vehicle 10. Optionally, control system 200 also includes a receiver or other communication module 210 for receiving user commands or input, such as from a remote terminal and/or a base as described below. The user commands or input received by the receiver can be used to control actuator 34, which as noted may be configured to extend or contract support 12.

For example, the commands may include commands to turn the actuator unit on or off, send a signal, for example, a Pulse Width Modulation (PWM) signal to the actuator (e.g., extend or contract support 12), or maintain a current state of the actuator. The commands can result in vehicle 10 changing its center of gravity to a specified configuration or maintaining a current configuration. In some embodiments, the change in center of gravity of vehicle 10 can be triggered to trim for flight conditions, as mentioned herein.

Consequently as would be understood, the addition of a payload, which causes static changes to the weight of the vehicle or dynamic changes necessarily alters the vehicle CoG from a static and known position to an unknown position and could cause dangerous oscillations by introducing undesirable torques and moments on the airframe. Further, altering of the center of gravity adds significantly to the energy required for the moment arm to translate and maintain forward flight.

With the stacked rotor arrangement, the center of gravity is generally located at a point equidistant between upper and lower frame assemblies 14 and 16 and aligned with IMU 206. However, as described above, when weight is added (e.g. from a payload or other load), the CoG will move absent a redistribution of weight on the vehicle. As noted above, control system 200 is configured to automatically respond to changes in payload in real time using input from load sensor array 208 to calculate the new center of gravity and compare to the original center of gravity and actuator 34 (e.g. on the vertical or z-axis) to redistribute the weight on vehicle 10, e.g. by increasing or decreasing the support length and separating upper and lower frame assemblies and restore the CoG to its original position. This transformation repositions the CoG on the z-axis of the vehicle at a point equidistant between upper and lower rotor plane moment arms at the center of mass whenever there is a change in payload or when an additional desired trim is required. Use of CoG transformation for trim not only affects the pitch tendency of the aircraft but also reduces the energy consumption since fewer aerodynamic forces are needed to balance the aircraft in forward flight. Onboard actuators for both the x and y vehicle axes can also be incorporated as part of the control system to respond to dynamic changes in payload in real time. Pitch, roll, and yaw may also be achieved by changing the relative proportion of thrust of each rotor and additional trim control can be achieved by transforming the center of gravity on the z axis using the telescoping feature of the support 12, which varies the distance between upper and lower frame assemblies through use of an actuator.

As noted above, the load sensor array can also be part of a separate ground station as opposed to onboard integration to determine payload center of mass and, therefore, payload alignment with the vehicle z-axis before payloads are added to the vehicle.

In one embodiment, the central processing unit 202 is configured, based on signals from the load sensor array 208, to calculate the degree of payload offset and provides user feedback data which can be sent to and displayed on a computer serial monitor interface or sent Bluetooth or Wifi to visually display on a smart device providing users with a simple and easy interface to manually center payload on the z-axis on the ground. This visually displayed feedback shows the degree of offset and the direction the payload needs to move in order to move the CoG back to its original position. Then a user can attach the payloads to the vehicle and orient them according to load sensor array feedback.

Alternatively, load sensor array 208 feedback can be used in restoring flight mode whenever a dynamic change to the payload center of gravity occurs. The load sensor 208 feedback can be used by central processing unit 202 to control actuator 34 (or actuators) to automatically respond to reposition payload on the x and y axis and minimize payload offset by repositioning the center of mass of the payload in alignment with vehicle z-axis.

In yet another embodiment, control system 200 may include an input device, such as a key pad, a touch screen, or a computer, including a smartphone, where a user can manually enter the weight value of a payload and control the actuator 34 to reposition the CoG based on the value input by the user.

In another embodiment, vehicle 10 may include a repositionable IMU and GPS antenna that can be automatically or manually repositioned but whose distances relative to one another do not change regardless of changes in payload or transforming the vehicles center of gravity. Upon transformation of the CoG, the IMU (and GPS antenna) maintain the same distances one to another and are moved in concert with one another to close proximity or at the transformed CoG automatically via actuators or optionally manually when configuring on the ground. The distance the IMU (and antenna) needs to move on the z-axis relative to a change in CoG on the z-axis is automatically calculated by central processing unit 202 and, further, can be displayed on a display, such as a computer as noted above. The IMU should rotate at the same rate as the vehicle when forces of roll, pitch and yaw are introduced and therefore is placed as close as possible to the CoG of the vehicle.

In yet another embodiment, the vehicle may have another movable mass, such as a movable battery (which powers the on board electronics and propulsion units), that can be moved to compensate for the added weight from a payload. In this embodiment rather than reconfiguring the vehicle support to redistribute the weight, the weight is redistributed by shifting the mass of one or more components supported by the vehicle.

As would be understood, vehicle 10 may have a variety of frame assembly configurations or support 12 configurations (adjustable or fixed) suitable for enabling one or more of the changes in center of gravity described herein. For example, as noted support 12 is adjustable so that it may be extended or contracted to increase or decrease the distance between frame assembly 14 relative to frame assembly 16. Optionally, actuator 34 may interconnect frame assembly 14 and frame assembly 16 to support 12. Actuator 34 may be coupled to brackets 16d and 14d using a coupler, such as a clevis. Further, a single actuator (as shown) or multiple actuators may be used to expand or contract support 12 to increase or decrease the distance separating frame assembly 14 relative to frame assembly 16 to redistribute the weight to maintain the CoG of vehicle 10 as a fixed location, as described below.

Optionally, in another embodiment, actuators may be integrated within the members that form support 12 and, further, optimize the functional media space available for a payload to perform its function. As noted, components supported by the vehicle may be moved or shifted by one or more actuators.

The members or elements of vehicle 10 described herein may be flexible elements or rigid elements, and may be fabricated using 3D printing or any suitable method using any suitable material or combination of materials. Suitable materials may include metals (e.g., stainless steel, titanium, aluminum), plastics (e.g., Acrylonitrile butadiene styrene (ABS), polystyrene, polypropylene), wood, composite materials (e.g., carbon fiber, fiberglass, Kevlar or any combination thereof to form a composite matrix), and the like.

As would be understood, the materials for vehicle 10 may be selected based on one or more of strength, weight, durability, stiffness, cost, processing characteristics, and other material properties. The couplings between the various members or elements described herein may involve interference fits, clearance fits, transition fits, and suitable combinations thereof. Linear and clamping couplings can include ball bearings, hinges, and other suitable joints. Fixed couplings may use one or more fasteners, such as nails, screws, bolts, clips, ties, and the like. In some embodiments, the materials and couplings can be configured to enhance stability and reduce vibration of the adaptive aerial vehicle during operation.

The systems, devices, and methods described herein can be applied to a wide variety of movable objects. As previously mentioned, any description herein of an adaptive aerial vehicle may apply to and be used for any movable object. A movable object of the present invention can be configured to move within any suitable environment, such as in the air (e.g., a fixed-wing aircraft or a rotary-wing aircraft), in the water (e.g., a ship or a submarine), on the ground (e.g., a motor vehicle or a train), under the ground (e.g., a subway), in space (e.g., a spaceplane, a satellite, or a probe), or any combination of these environments. The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof.

As described above, in some instances, the movable object is a vehicle, namely an aerial vehicle. In addition to aerial vehicles, suitable vehicles may include water vehicles, space vehicles, or ground vehicles. The systems, devices, and methods disclosed herein can be used for any vehicle capable of lifting off from and landing on surfaces (e.g., an underwater surface such as a sea floor, an extraterrestrial surface such as an asteroid). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof.

The aerial vehicles of the present disclosure can include fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). The aerial vehicle may be capable of moving freely within the environment with respect to six degrees of freedom (e.g., three degrees of freedom in translation and three degrees of freedom in rotation). Alternatively, the movement of the aerial vehicle can be constrained with respect to one or more degrees of freedom, such as by a predetermined path or track. The movement can be actuated by any suitable actuation mechanism, such as an engine or a motor. In some embodiments, the aerial vehicle can be a self-propelled aerial vehicle. Self-propelled aerial vehicles can be driven by a propulsion system as previously described herein. The propulsion system can be used to enable the aerial vehicle to take off from a surface, land on a surface, maintain its current position and/or orientation (e.g., hover), change orientation, and/or change position.

As noted above, the propulsion system can include one or more propulsion units, which may comprise rotors. A rotor can include one or more blades (e.g., one, two, three, four, or more blades) affixed to a medial shaft. The blades can be disposed symmetrically or asymmetrically about the medial shaft. The blades can be turned by rotation of the medial shaft, which can be driven by a suitable motor or engine. The blades can be configured to spin in a clockwise rotation and/or a counterclockwise rotation. The rotor can be a horizontal rotor (which may refer to a rotor having a horizontal plane of rotation), a vertically oriented rotor (which may refer to a rotor having a vertical plane of rotation), or a rotor tilted at an intermediate angle between the horizontal and vertical positions. In some embodiments, horizontally oriented rotors may spin and provide lift to the aerial vehicle. Vertically oriented rotors may spin and provide thrust to the aerial vehicle. Rotors oriented an intermediate angle between the horizontal and vertical positions may spin and provide both lift and thrust to the aerial vehicle. One or more rotors may be used to provide a torque counteracting a torque produced by the spinning of another rotor.

Optionally, in another embodiment, the adaptive aerial vehicle can be controlled remotely by a user or controlled locally by an occupant within or on the adaptive aerial vehicle. In some embodiments, as noted, the adaptive aerial vehicle is an unmanned aerial vehicle (UAV). A UAV may not have an occupant onboard the aerial vehicle. The adaptive aerial vehicle can be controlled by a human or an autonomous control system (e.g., a computer control system), or any suitable combination thereof. The adaptive aerial vehicle can be an autonomous or semi-autonomous robot, such as a robot configured with an artificial intelligence.

The adaptive aerial vehicle can have any suitable size and/or dimensions. In some embodiments, the adaptive aerial vehicle may be of a size and/or dimensions to have a human occupant within or on the vehicle. Alternatively, the adaptive aerial vehicle may be of size and/or dimensions smaller than that capable of having a human occupant within or on the vehicle. The adaptive aerial vehicle may be of a size and/or dimensions suitable for being lifted or carried by a human. Alternatively, the adaptive aerial vehicle may be larger than a size and/or dimensions suitable for being lifted or carried by a human.

In some embodiments, as noted, the adaptive aerial vehicle can be configured to carry a payload or simply a load. The load can include one or more of passengers, cargo, equipment, instruments, and the like. The load can be provided within a housing. The housing may be separate from a housing of the adaptive aerial vehicle, or be part of a housing for an aerial vehicle. Alternatively, the load can be provided with a housing while the aerial vehicle does not have a housing. Alternatively, portions of the load or the entire load can be provided without a housing. The load can be rigidly fixed relative to the adaptive aerial vehicle. Optionally, the load can be movable relative to the adaptive aerial vehicle (e.g., translatable or rotatable relative to the adaptive aerial vehicle).

In some embodiments, as noted above, the load may comprise a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the adaptive aerial vehicle. Optionally, the payload may be configured to interact with the environment or a target. For example, the payload may include a tool, instrument, or mechanism capable of manipulating objects, such as a robotic arm.

Optionally, as described above, vehicle 10 may include a payload support 40 mounted to base 20. Although referred to as a payload support, support 40 may be simply a load support. Alternatively, the payload can be mounted on the adaptive aerial vehicle without requiring a support. The support or a carrier may be integrally formed with the payload carrier. In some embodiments, the payload can include one or more payload elements, and one or more of the payload elements can be movable relative to the adaptive aerial vehicle and/or the carrier, as described above. Optionally, as described in reference to vehicle 310 (FIG. 12), the vehicle may include a payload support mounted in the vehicle support.

Payload support 40 may be integrally formed with the adaptive aerial vehicle. Alternatively, the payload support may be releasably coupled to the adaptive aerial vehicle. The carrier can be coupled to the adaptive aerial vehicle either directly or indirectly. In addition, payload support 40 may include a movable mounting structure, including a gimbal platform capable of stabilizing and/or directing the movement of the payload. In some embodiments, the carrier can be adapted to control the state of the payload (e.g., position and/or orientation) relative to the adaptive aerial vehicle. For example, the payload support can be configured to move relative to the adaptive aerial vehicle (e.g., with respect to one, two, or three degrees of translation and/or one, two, or three degrees of rotation) such that the payload maintains its position and/or orientation relative to a suitable reference frame regardless of the movement of the adaptive aerial vehicle. The reference frame can be a fixed reference frame (e.g., the surrounding environment). Alternatively, the reference frame can be a moving reference frame (e.g., the adaptive aerial vehicle, a payload target).

In some embodiments, the payload support may be configured to permit movement of the payload relative to the payload support and/or adaptive aerial vehicle. The movement can be a translation with respect to up to three degrees of freedom (e.g., along one, two, or three axes) or a rotation with respect to up to three degrees of freedom (e.g., about one, two, or three axes), or any suitable combination thereof.

In addition, the payload support 40 may include one or more actuators (e.g., linear actuators, worm drives) that actuate movement of the payload support components, such as support plate 40b and/or base plate 40a. The actuators can permit the movement of multiple payload support components simultaneously, or may be configured to permit the movement of a component at a time. The movement of the payload support components can produce a corresponding movement of the payload. For example, the payload support actuator may induce rotation of one or more payload support components about one or more axes of rotation (e.g., roll axis, pitch axis, or yaw axis). The rotation of the one or more components can cause a payload to rotate about one or more axes of rotation relative to the adaptive aerial vehicle. Alternatively or in combination, the payload support actuator may induce translation of one or more payload support components along one or more axes of translation, and thereby produce a translation of the payload along one or more corresponding axes relative to the adaptive aerial vehicle.

In some embodiments, the movement of the adaptive aerial vehicle, support 12, payload support, and payload relative to a fixed reference frame (e.g., the surrounding environment) and/or to each other, can be controlled by a terminal. The terminal may be a remote control device at a location distant from the adaptive aerial vehicle, support 12, payload support, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display.

Any suitable user input can be used to interact with the terminal, such as manually entered commands, voice control, gesture control, or position control (e.g., via a movement, location or tilt of the terminal).

The terminal can be used to control any suitable state of the adaptive aerial vehicle, support 12, payload support, and/or payload. For example, the terminal can be used to control the position and/or orientation of the adaptive aerial vehicle, support 12, payload support, and/or payload relative to a fixed reference from and/or to each other. In some embodiments, the terminal can be used to control individual elements of the adaptive aerial vehicle, support 12, payload support, and/or payload, such as the actuator of the payload support, a sensor of the payload, or an emitter of the payload. The terminal can include a wireless communication device adapted to communicate with one or more of the adaptive aerial vehicle, support 12, payload support, or payload.

The terminal may include a suitable display unit for viewing information of the adaptive aerial vehicle, support 12, payload support, and/or payload. For example, the terminal can be configured to display information of the adaptive aerial vehicle, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Figure 12:
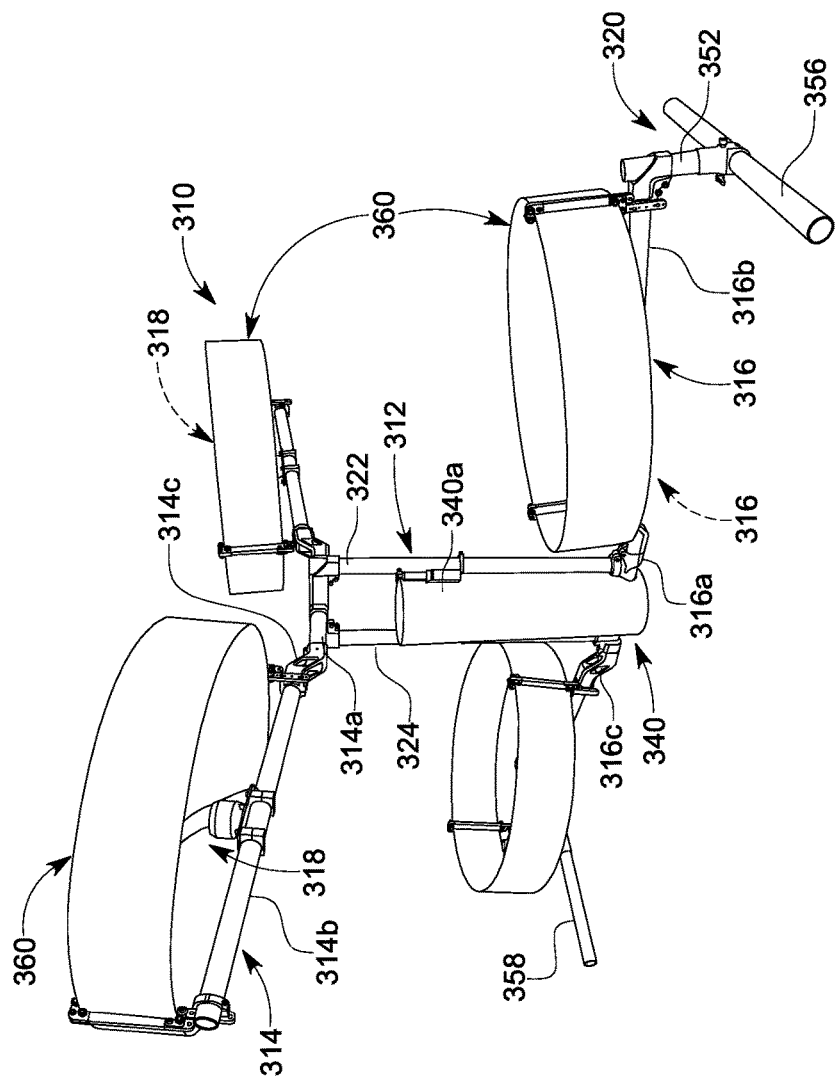
FIG. 12 is an elevation view of another embodiment of the adaptive aerial vehicle

Referring to FIG. 12, the numeral 310 designates another embodiment of an adaptive aerial vehicle. Vehicle 310 includes a vehicle support 312 to which first and second (e.g. upper and lower) frame assemblies 314 and 316 are mounted and which respectively support one or more propulsion units 318. Vehicle 310 may include a control system similar to control system 200 described above, with a flight controller and a central processing unit to control other functions, such as control of the payload support actuator described below and/or one or more actuators to either change the configuration of the vehicle support or location of various masses to redistribute weight similar to the previous embodiments.

In the illustrated embodiment, similar to lift assemblies 14, 16, each lift assembly 314, 316 supports two propulsion units 318, which are mounted to the opposed ends of each respective frame assembly. Also similar to the vehicle 10, frame assemblies 314, 316 are each formed from a transverse member 314a, 316a and arms 314b, 316b which are optionally mounted to their respective transverse members 314a, 316a by hinged connections 314c, 316c.

Vehicle 310 also may include a base 320. In the illustrated embodiment base 320 is formed by two legs 352 (only one shown), which are respectively mounted to the ends of (or formed as extensions of) arms 316b of frame assembly 316 and include feet 356, 358 to stabilize vehicle.

In addition, vehicle 310 may include shrouds 360 mounted about each of its propulsion units 318. Shrouds 360 may comprise annular wings, formed for example, by ring-shaped plates that are mounted to arms 314b, 316b by brackets and which extend around and are spaced from the tips of the propulsion unit blades to form blade enclosures. It should be understood that vehicle 10 may also incorporate shrouds, such as shrouds 360.

In the illustrated embodiment, vehicle 310 includes a payload support or mount 340 that is mounted to and further in vehicle support 312. Additionally, the payload support may be integrated into the vehicle support and, further, improve the aerodynamics of the vehicle support given the shape of the payload support and the material forming the payload support (e.g. low friction material). In the illustrated embodiment, payload support 340 is formed by a tube and, further, a cylindrical tube 340a, which forms a housing and that mounts to vehicle support 312 between support frame members 322, 324 of vehicle support 312 to locate the payload support or mount between frame assemblies 314 and 316, and above the lower frame assembly 316. In this manner, the payload support or mount is between the two frame assemblies 314, 316 and between frame members 322, 324 of vehicle support 312 so that payload support 340 is closer to the center of gravity of vehicle 310 than in the previous embodiment, which can reduce the need for redistribution of the weight or configuration of vehicle 310.

Optionally, frame members 322, 324 may comprise fixed length tubes or telescoping tubes similar to telescoping members 22, 24 of vehicle 10. Further tube 340a may be pivotally mounted to support 312, for example, about transverse member 316a of frame assembly 316. In this manner, payload support 340 may be deployed from, for example, a transit position where payload support 340 is located in support 312, and a deployed position, where payload support 340 extended from, e.g. pivoted about transverse member 316a, so that the payload may be released, if not ejected, from the payload support. For example, the payload may be released and dispensed or deployed under the force of gravity. Alternately, the payload may be ejected from the payload support by a spring or actuator or the like mounted in payload support 340.

In one embodiment, vehicle 310 includes an actuator which moves the payload support between its transit position and its dispending position. A suitable actuator may comprise a linear actuator mounted between the upper end of the payload support tube and vehicle support 312, which when extended or retracted either moves or releases the payload support (about transverse member 316a) to pivot between its transit position and its dispensing position. Optionally, vehicle 310 may include a switch to allow a user to control actuation of the actuator that moves the payload support between its transit position and its dispensing position.

In one embodiment, the payload support actuator may be programmed (via the on board control system) to move the payload support between its transit position and its dispensing position based on a location, for example, a delivery location. Additionally, vehicle 310 may include another actuator to return the payload support to its transit position, which may be controlled by the onboard control system, controlled remotely by a remote controller, or controlled manually.

In one embodiment, the payload support may be locked in place by a latch or latches, such as solenoid based-latches, but which are released, for example, by the onboard control system. For example, the control system may release the latch or latches based on user input, e.g. from a remote control device, or based on reaching a destination, which is detected using, for example, the flight controller antenna (e.g. the GPS antenna). The payload support is configured so that when the latches are released, the tube will pivot about transverse member 316a to release or eject the payload, either under gravity or under the force of a spring, and actuator, or the like. This automatic pivoting once the latch or latches are released may be achieved by the geometry of the tube, for example, mounting the tube so that is offset from transverse member 316a or by adding weight to the tube.

In another embodiment, the payload support may be formed so that it is in effect the payload. For example, the payload may be housed in a payload support that is mounted in the vehicle support but is itself ejected from the vehicle support when the payload is to be delivered. For example, the payload support may be integrated into the vehicle support and, further, when integrated improves the aerodynamics of the vehicle support given the shape of the payload support and the material forming the payload support (e.g. low friction material). For example, the payload support may be formed by a tube and further a cylindrical tube similar to payload support 340 but rather than being pivotally mounted about transverse member 316a is mounted on top of transverse member 316a and held in place, for example, by one or more releasable latches, similar to the latches described above, which when released allow the payload support to be ejected (e.g. by a spring or the like) or deployed (by simply releasing the payload support).

It should be understood that vehicle 310 may be configured, such as described in reference to vehicle 10, to redistribute the weight of the vehicle, for example by a similar control system and actuator described above, when a payload or other load is added to the vehicle.

Figure 13:
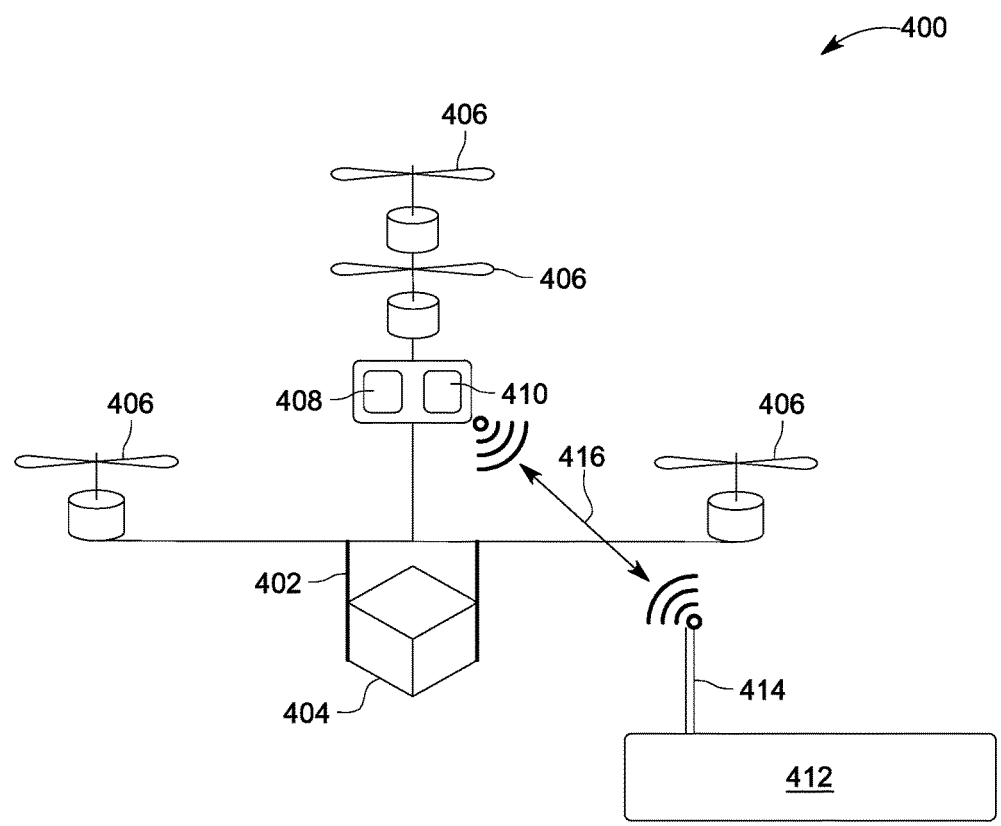
FIG. 13 is a schematic drawing of the adaptive aerial vehicle.

Referring to the schematic drawing of FIG. 13, the numeral 400 generally designates another embodiment adaptive of an aerial vehicle. Vehicle 400 includes a payload support structure 402, such as a frame or housing, for supporting a payload 404, which mounted to its support frame and/or frame assemblies (shown only schematically). For examples of support frames and frame assemblies reference is made the supports and frame assemblies of the previous embodiments.

Alternatively, the payload 404 may be provided on the adaptive aerial vehicle 400 without requiring the payload support structure 402. The adaptive aerial vehicle 400 may include propulsion units 406, a sensing system 408, and a transceiver 410. As is the case with all the propulsion units described herein, propulsion units 406 may include one or more of rotors, propellers, blades, engines, motors, wheels, axles, magnets, or nozzles, as previously described herein. The adaptive aerial vehicle may have one or more, two or more, three or more, or four or more propulsion units. The propulsion units may all be of the same type. Alternatively, one or more propulsion units can be different types of propulsion units. In some embodiments, the propulsion units 406 can enable the adaptive aerial vehicle 400 to take off vertically from a surface or land vertically on a surface without requiring any horizontal movement of the adaptive aerial vehicle 400 (e.g., without traveling down a runway). Optionally, the propulsion units 406 can be operable to permit the adaptive aerial vehicle 400 to hover in the air at a specified position and/or orientation.

For example, the adaptive aerial vehicle 400 can have propulsion units with multiple horizontally oriented rotors that can provide lift and/or thrust to the adaptive aerial vehicle. The multiple horizontally oriented rotors can be actuated to provide vertical takeoff, vertical landing, and hovering capabilities to the adaptive aerial vehicle 400. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the adaptive aerial vehicle 400 (e.g., with respect to up to three degrees of translation and up to three degrees of rotation).

The sensing system 408 can include one or more sensors that may sense the spatial disposition, velocity, and/or acceleration of the adaptive aerial vehicle 400 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 408 can be used to control the spatial disposition, velocity, and/or orientation of the adaptive aerial vehicle 400 (e.g., using a suitable processing unit and/or control module, as described below). Alternatively, the sensing system 408 can be used to provide data regarding the environment surrounding the adaptive aerial vehicle, such as weather conditions, proximity to potential obstacles, location of geographical features, location of manmade structures, and the like.

The transceiver 410 enables communication with terminal 412 having a transceiver 414 via wireless signals 416. In some embodiments, the communication can include two-way communication, with the terminal 412 providing control commands to one or more of the adaptive aerial vehicle 400, carrier 402, and payload 404, and receiving information from one or more of the adaptive aerial vehicle 400, carrier 402, and payload 404 (e.g., position and/or motion information of the adaptive aerial vehicle, carrier or payload; data sensed by the payload such as image data captured by a payload camera). In some instances, control commands from the terminal may include instructions for relative positions, movements, actuations, or controls of the adaptive aerial vehicle, carrier and/or payload. For example, the control command may result in a modification of the location and/or orientation of the adaptive aerial vehicle (e.g., via control of the propulsion units 406), or a movement of the payload with respect to the adaptive aerial vehicle (e.g., via control of the carrier 402). The control command from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the adaptive aerial vehicle, carrier and/or payload may include information from one or more sensors (e.g., of the sensing system 408 or of the payload 404). The communications may include sensed information from one or more different types of sensors (e.g., GPS sensors, motion sensors, inertial sensor, proximity sensors, or image sensors). Such information may pertain to the position (e.g., location, orientation), movement, or acceleration of the adaptive aerial vehicle, carrier and/or payload. Such information from a payload may include data captured by the payload or a sensed state of the payload. The control commands provided transmitted by the terminal 412 can be configured to control a state of one or more of the adaptive aerial vehicle 400, carrier 402, or payload 404. Alternatively or in combination, the carrier 402 and payload 404 can also each include a transceiver configured to communicate with terminal 412, such that the terminal can communicate with and control each of the adaptive aerial vehicle 400, carrier 402, and payload 404 independently.

Figure 14:
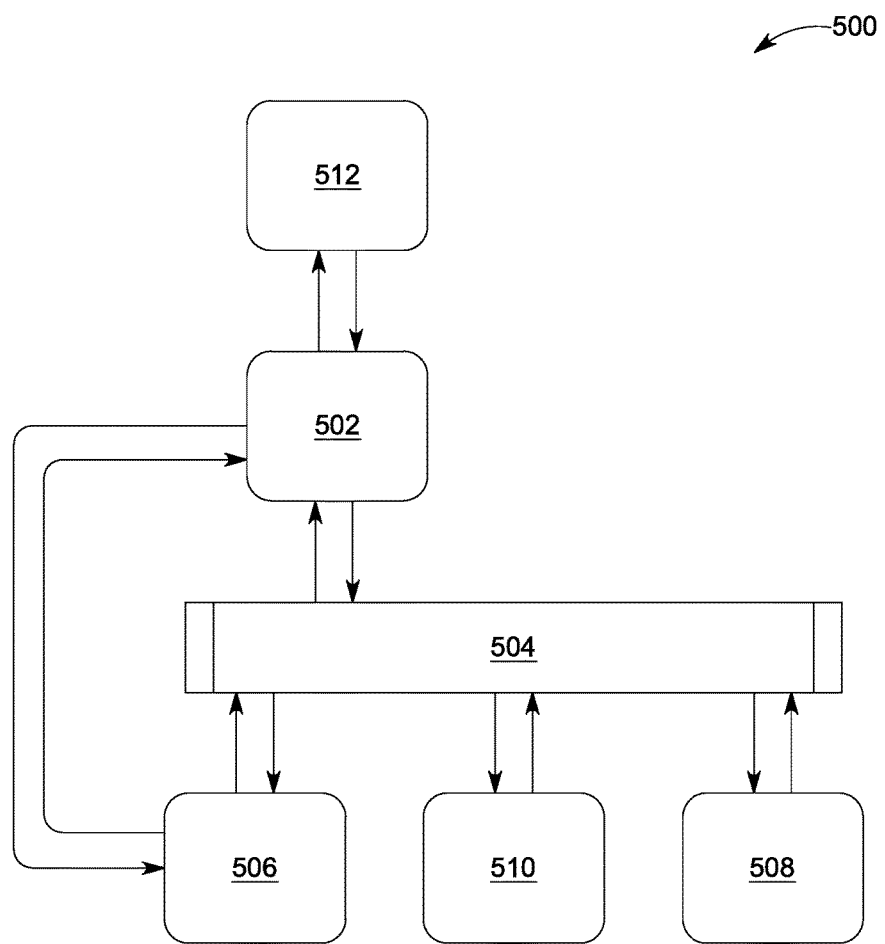
FIG. 14 is a block diagram of a sensor array of the adaptive aerial vehicle.

Referring to FIG. 14, the numeral 500 designates a system 500 for controlling an adaptive aerial vehicle, including any of the above adaptive aerial vehicles. The system 500 can be used in combination with any suitable embodiment of the systems, devices, and methods disclosed herein. The system 500 can include a sensing module 502, processing unit 504, non-transitory computer readable medium 506, control module 508, and communication module 510.

The sensing module 502 can utilize different types of sensors that collect information relating to the adaptive aerial vehicles in different ways. Different types of sensors may sense different types of signals or signals from different sources. For example, the sensors can include inertial sensors, GPS sensors, proximity sensors (e.g., lidar), or vision/image sensors (e.g., a camera). The sensing module 502 can be operatively coupled to a processing unit 504 having a plurality of processors. In some embodiments, the sensing module can be operatively coupled to a transmission module 512 (e.g., a Wi-Fi image transmission module) configured to directly transmit sensing data to a suitable external device or system. For example, the transmission module 512 can be used to transmit images captured by a camera of the sensing module 502 to a remote terminal.

The processing unit 504 can have one or more processors, such as a programmable processor (e.g., a medialprocessing unit (CPU)). The processing unit 504 can be operatively coupled to a non-transitory computer readable medium 506. The non-transitory computer readable medium 506 can store logic, code, and/or program instructions executable by the processing unit 504 for performing one or more steps. The non-transitory computer readable medium can include one or more memory units (e.g., removable media or external storage such as an SD card or random access memory (RAM)). In some embodiments, data from the sensing module 502 can be directly conveyed to and stored within the memory units of the non-transitory computer readable medium 506. The memory units of the non-transitory computer readable medium 506 can store logic, code and/or program instructions executable by the processing unit 504 to perform any suitable embodiment of the methods described herein. For example, the processing unit 504 can be configured to execute instructions causing one or more processors of the processing unit 504 to analyze sensing data produced by the sensing module. The memory units can store sensing data from the sensing module to be processed by the processing unit 504. In some embodiments, the memory units of the non-transitory computer readable medium 506 can be used to store the processing results produced by the processing unit 504.

In some embodiments, the processing unit 504 can be operatively coupled to a control module 508 configured to control a state of the adaptive aerial vehicle. For example, the control module 508 can be configured to control the propulsion units of the adaptive aerial vehicle to adjust the spatial disposition, velocity, and/or acceleration of the movable object with respect to six degrees of freedom. Alternatively or in combination, the control module 508 can control one or more of a state of a carrier, payload, or sensing module.

The processing unit 504 can be operatively coupled to a communication module 510 configured to transmit and/or receive data from one or more external devices (e.g., a terminal, display device, or other remote controller). Any suitable means of communication can be used, such as wired communication or wireless communication. For example, the communication module 510 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 510 can transmit and/or receive one or more of sensing data from the sensing module 502, processing results produced by the processing unit 504, predetermined control data, user commands from a terminal or remote controller, and the like.

The components of the system 500 can be arranged in any suitable configuration. For example, one or more of the components of the system 500 can be located on the adaptive aerial vehicle, carrier, payload, terminal, sensing system, or an additional external device in communication with one or more of the above. Additionally, although FIG. 14 depicts a single processing unit 504 and a single non-transitory computer readable medium 506, one of skill in the art would appreciate that this is not intended to be limiting, and that the system 500 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 500 can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

I claim:

1. An adaptive aerial vehicle comprising:
a vehicle support;
a payload support structure to provide a payload support;
upper and lower frame assemblies mounted relative to said vehicle support and to straddle the payload support structure wherein the payload support is located between the upper and lower frame assemblies; and
propulsion units mounted to said upper and lower frame assemblies for flying the vehicle.

2. The adaptive aerial vehicle according to claim 1 further comprising
an actuator configured to move the vehicle support relative to the upper and lower frame assemblies to redistribute the weight of said adaptive aerial vehicle.

3. The adaptive aerial vehicle according to claim 2, wherein said actuator is configured to move the vehicle support relative to the upper and lower frame assemblies between a plurality of positions.

4. The adaptive aerial vehicle according to claim 2, wherein said actuator extends or contracts said vehicle support to change the distance between said upper and lower frame assemblies.

5. The adaptive aerial vehicle according to claim 4, wherein extension or contraction of said vehicle support is configured to simultaneously increase or decrease the distance between said upper and lower frame assemblies.

6. The adaptive aerial vehicle according to claim 2, further comprising a controller and a sensor in communication with said controller, said controller in communication with and controlling said actuator, said sensor configured to detect the weight of a payload to be carried by said adaptive aerial vehicle, and said controller operable to drive said actuator to extend or contract said vehicle support in response to the weight detected by said sensor to compensate for the change in center of gravity due to weight of the payload.

7. The adaptive aerial vehicle according to claim 6, wherein said sensor is mounted to said adaptive aerial vehicle.

8. The adaptive aerial vehicle according to claim 6, wherein said controller is configured to automatically extend or contract said vehicle support to redistribute the adaptive aerial vehicle weight to compensate for the change in center of gravity due to the weight of the payload.

9. The adaptive aerial vehicle according to claim 6, wherein said controller is configured to automatically extend or contract said vehicle support to redistribute the adaptive aerial vehicle weight to compensate for the change in center of gravity due to the dynamic changes in the weight of the payload.

10. The adaptive aerial vehicle according to claim 2, wherein said vehicle support comprises a support frame.

11. The adaptive aerial vehicle according to claim 4, wherein said actuator is coupled to at least one of said upper and lower frame assemblies.

12. The adaptive aerial vehicle according to claim 6, further comprising a receiver, said receiver configured to receive commands for controlling said actuator and/or said propulsion units.

13. The adaptive aerial vehicle according to claim 5, further comprising a restraint coupled to said payload support structure and said vehicle support, and said actuator configured to extend said vehicle support wherein said restraint applies a force to the payload support structure when said actuator extends said vehicle support.

14. The adaptive aerial vehicle according to claim 13, wherein said restraint comprises a resilient restraint.

15. The adaptive aerial vehicle according to claim 1, wherein said payload support structure comprises a tube integrated in said vehicle support.

16. The adaptive aerial vehicle according to claim 15, wherein said tube is pivotally mounted to said lower frame assembly.

17. An aerial vehicle having a center of gravity, said vehicle comprising:
a support;
upper and lower frame assemblies mounted relative to said support and to straddle the center of gravity of the vehicle and wherein the upper and lower frame assemblies are substantially equally spaced from the center of gravity; and
propulsion units mounted to said upper and lower frame assemblies for flying the vehicle.

18. The aerial vehicle according to claim 17, further comprising an actuator configured to move the upper and lower frame assemblies to change the distance between said upper and lower frame assemblies.

19. The adaptive aerial vehicle according to claim 10, wherein said support frame is formed from two telescoping members.

20. The adaptive aerial vehicle according to claim 11, wherein said actuator is coupled to both of said upper and lower frame assemblies.

* * * * *